(12) United States Patent
Van Roekel et al.

(10) Patent No.: US 11,470,760 B2
(45) Date of Patent: Oct. 18, 2022

(54) COMPARATIVE AGRICULTURAL OBSTACLE MONITOR AND GUIDANCE SYSTEM AND METHOD FOR SAME

(71) Applicant: Raven Industries, Inc., Sioux Falls, SD (US)

(72) Inventors: Jeffrey Allen Van Roekel, Sioux Falls, SD (US); Alex John Weidenbach, Sioux Falls, SD (US); John D. Preheim, Beresford, SD (US); Drew John Waltner, Sioux Falls, SD (US); Joel Quentin Quanbeck, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/982,495

(22) PCT Filed: Aug. 13, 2019

(86) PCT No.: PCT/US2019/046420
§ 371 (c)(1),
(2) Date: Sep. 18, 2020

(87) PCT Pub. No.: WO2020/037003
PCT Pub. Date: Feb. 20, 2020

(65) Prior Publication Data
US 2021/0195824 A1 Jul. 1, 2021

Related U.S. Application Data

(60) Provisional application No. 62/718,359, filed on Aug. 13, 2018.

(51) Int. Cl.
*A01B 69/04* (2006.01)
*A01D 41/127* (2006.01)
(Continued)

(52) U.S. Cl.
CPC ........ *A01B 69/008* (2013.01); *A01D 41/1278* (2013.01); *B60W 30/10* (2013.01);
(Continued)

(58) Field of Classification Search
CPC ...... G01S 13/86; G01S 13/862; G01S 13/865; G01S 13/867; G01S 13/878; G01S 13/88;
(Continued)

(56) References Cited

U.S. PATENT DOCUMENTS 4,573,547 A 3/1986 Yoshimur et al.
5,509,486 A 4/1996 Andersen
(Continued)

FOREIGN PATENT DOCUMENTS

CA      3091297 A1 *  8/2019  ........... A01B 79/005
DE  112014000906 T5 * 11/2015  ........... A01B 79/005
(Continued)

OTHER PUBLICATIONS

"International Application Serial No. PCT/US2019/046420, international Search Report dated Oct. 28, 2019", 3 pgs.
(Continued)

*Primary Examiner* — Atul Trivedi
(74) *Attorney, Agent, or Firm* — Schwegman Lundberg & Woessner, P.A.

(57) ABSTRACT

An agricultural vehicle monitoring system includes one or more noncontact sensors configured to sense multiple objects along a scanline. A comparative vehicle monitor is in communication with the one or more noncontact sensors. The comparative vehicle monitor is configured to provide a specified row width and to identify one or more crop rows from the scan line and determine one or more lengths of scan line segments between identified crop rows. The comparative vehicle monitor is further configured to determine a vehicle position including one or more of a vehicle angle or
(Continued)

a vehicle location according to the specified row width and the one or more determined lengths of scan line segments between the identified crop rows.

55 Claims, 18 Drawing Sheets

(51) Int. Cl.
  *B60W 30/10* (2006.01)
  *G01S 13/88* (2006.01)
(52) U.S. Cl.
  CPC .......... *G01S 13/88* (2013.01); *B60W 2300/15* (2013.01); *B60W 2420/52* (2013.01); *B60W 2554/20* (2020.02); *B60W 2710/20* (2013.01)
(58) Field of Classification Search
  CPC .... G01S 17/88; G01S 15/88; B60W 2420/52; B60W 30/10; B60W 2710/20; B60W 2554/20; B60W 2300/15; G01C 22/00; A01D 41/1278
  USPC .......................................................... 701/41
  See application file for complete search history.

(56) References Cited

U.S. PATENT DOCUMENTS

| | | | | |
|---|---|---|---|---|
| 6,336,051 | B1* | 1/2002 | Pangels | A01D 41/1278 700/207 |
| 7,904,218 | B2* | 3/2011 | Jochem | A01D 41/1278 701/28 |
| 8,019,513 | B2* | 9/2011 | Jochem | A01B 69/001 701/28 |
| 8,121,345 | B2* | 2/2012 | Jochem | G06V 20/588 382/103 |
| 9,668,420 | B2* | 6/2017 | Anderson | A01B 79/005 |
| 10,524,407 | B2 | 1/2020 | Schleicher et al. | |
| 2002/0106108 | A1* | 8/2002 | Benson | B62D 1/28 382/104 |
| 2007/0001096 | A1* | 1/2007 | Wei | A01B 69/001 250/208.1 |
| 2007/0003107 | A1* | 1/2007 | Wei | A01B 69/008 382/104 |
| 2007/0014434 | A1* | 1/2007 | Wei | G06V 20/588 382/104 |
| 2007/0271013 | A1 | 11/2007 | Jochem et al. | |
| 2008/0294309 | A1* | 11/2008 | Kaprielian | G01S 17/86 342/357.31 |
| 2011/0231061 | A1 | 9/2011 | Reeve et al. | |
| 2012/0237083 | A1* | 9/2012 | Lange | G06F 16/29 382/103 |
| 2013/0282200 | A1 | 10/2013 | Anderson | |
| 2015/0253427 | A1* | 9/2015 | Slichter | G01S 7/4808 356/5.01 |
| 2015/0321694 | A1 | 11/2015 | Nelson, Jr. et al. | |
| 2016/0185346 | A1 | 6/2016 | Awamori et al. | |
| 2017/0018188 | A1 | 1/2017 | Ono et al. | |
| 2017/0089742 | A1 | 3/2017 | Bruns et al. | |
| 2017/0090068 | A1* | 3/2017 | Xiang | G01V 99/005 |
| 2017/0223889 | A1 | 8/2017 | Cavender-bares | |
| 2017/0325443 | A1* | 11/2017 | Crinklaw | G05D 1/0274 |
| 2017/0325444 | A1* | 11/2017 | Crinklaw | A01M 7/0089 |
| 2017/0339827 | A1* | 11/2017 | Anderson | A01D 45/025 |
| 2017/0357029 | A1* | 12/2017 | Lakshmanan | G06Q 10/04 |
| 2018/0168094 | A1* | 6/2018 | Koch | G01J 5/0875 |
| 2018/0271016 | A1* | 9/2018 | Milano | A01D 33/14 |
| 2018/0325012 | A1* | 11/2018 | Ferrari | A01B 79/02 |
| 2019/0094857 | A1* | 3/2019 | Jertberg | G05D 1/0278 |
| 2019/0129435 | A1* | 5/2019 | Madsen | B62D 6/001 |
| 2020/0020103 | A1* | 1/2020 | Sneyders | G06T 7/73 |
| 2020/0100422 | A1 | 4/2020 | Schleicher et al. | |
| 2021/0022282 | A1* | 1/2021 | Wallach | A01B 31/00 |
| 2021/0132618 | A1* | 5/2021 | Van Roekel | G05D 1/0219 |
| 2021/0331695 | A1 | 10/2021 | Ramakrishnan et al. | |
| 2021/0357664 | A1* | 11/2021 | Kocer | B64C 39/024 |

FOREIGN PATENT DOCUMENTS

| | | | | |
|---|---|---|---|---|
| EP | 1473673 | A2 * | 11/2004 | ............ G01C 23/00 |
| EP | 1738630 | A1 * | 1/2007 | ........... A01B 69/001 |
| EP | 1738631 | A1 * | 1/2007 | ........... A01B 69/001 |
| EP | 2517543 | A2 | 10/2012 | |
| EP | 3033933 | A1 | 6/2016 | |
| EP | 3342274 | A1 * | 7/2018 | ........... A01B 69/008 |
| JP | 3877301 | B2 * | 2/2007 | |
| WO | WO-2020037003 | A1 | 2/2020 | |

OTHER PUBLICATIONS

"International Application Serial No. PCT/US2019/046420, Written Opinion dated Oct. 28, 2019", 26 pgs.
"International Application Serial No. PCT/US2019/046420, International Preliminary Report on Patentability dated Feb. 25, 2021", 28 pgs.
"International Application Serial No. PCT/US2021/062969, International Search Report dated Mar. 21, 2022", 2 pgs.
"International Application Serial No. PCT/US2021/062969, Written Opinion dated Mar. 21, 2022", 11 pgs.
Erfani, et al., "Comparison of two data fusion methods for localization of wheeled mobile robot in farm conditions", Artificial Intelligence in Agriculture vol. 1, (May 15, 2019), 48-55.
"European Application Serial No. 19850326.0, Extended European Search Report dated May 3, 2022", 16 pgs.

\* cited by examiner

COMPARATIVE AGRICULTURAL OBSTACLE MONITOR AND GUIDANCE SYSTEM AND METHOD FOR SAME

CLAIM OF PRIORITY

This application is a U.S. national stage application filed under 35 U.S.C. § 371 from International Application Serial No. PCT/US2019/046420, which was filed 13 Aug. 2019, and published as WO2020/037003 A1 on 20 Feb. 2020, and which claims the benefit of priority, to U.S. Provisional Patent Application Ser. No. 62/718,359, filed Aug. 13, 2018, which applications are incorporated herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries. Inc. of Sioux Falls, S. Dak. All Rights Reserved.

TECHNICAL FIELD

This document pertains generally, but not by way of limitation, to agricultural vehicle position monitoring and guidance.

BACKGROUND

Agricultural vehicles provide one or more planting, husbandry or harvesting functions in fields. For instance, agricultural planters sow crops and, in some examples, apply one or more agricultural products. In another example, agricultural sprayers periodically apply agricultural products such as liquid and granular products to the field and crops, and in some examples apply the agricultural product to crops at various stages of development. Agricultural harvesters reap, thresh and winnow the crop.

In some examples, operators navigate fields and crops by sight. With agricultural sprayers, the operator uses indexed locations on the vehicle to guide wheels between crop rows and minimize crushing of crops. In other examples, agricultural harvesters are also navigated by sight. The operator judges or knows the width of the harvester head and guides the harvester (e.g., by counting rows, choosing a base row to navigate along or the like) to minimize missing rows and having to repeat passes.

Agricultural sprayers optionally use mechanical whiskers to assist with guidance. The whiskers are suspended beneath the sprayer in line with oncoming crops that will pass beneath the vehicle. The mechanical whiskers deflect upon engaging a plant, and an instrument coupled with the whisker detects the deflection and provides an indication of the plant to the operator, for instance visually on a screen. The operator uses the indication of the plant to guide steering between crop rows.

Optionally, agricultural vehicles include Global Positions System (GPS) location monitoring that logs the vehicle location. In some examples, the operator navigates an agricultural vehicle according to the GPS location. In other examples, the agricultural vehicle includes an automated steering system that actively navigates the vehicle or provides steering cues based on the GPS location. In these automated steering systems, at least two guidance parameters are continuously ascertained or updated as an agricultural vehicle navigates for crop rows of a field: track-angle error and cross-track distance.

OVERVIEW

Track-angle error involves the angle between the forward direction of an agricultural vehicle and one or more crop rows such that track-angle error is 0° when the agricultural vehicle is following parallel to a row, while track-angle error is 90° when an agricultural vehicle is moving perpendicular to a row. Accordingly, the track-angle error can be considered the current angle-of-attack for an agricultural vehicle moving towards a given row. The cross-track distance is the distance between a current position of an agricultural vehicle and a crop row. Using track-angle error and cross-track distance as parameters to the steering module can allow for an effective automated guidance of an agricultural vehicle through a field of row crops. Ascertaining and updated such parameters, however, require accurate detection of crops in such fields.

The present inventors have recognized, among other things, that a problem to be solved includes increasing the accuracy and confidence of crop (or crop row) detection and at the same time eliminating contact-based crop detection. Agricultural vehicles, such as sprayers, are in some examples operated in fields having developed crops. Such developed crops can include corn, wheat, and other crops that include stalks. In the case of corn one or more leaf collars are presented by the plant based on its stage of development. Crop growth creates a crop canopy, and with sufficient growth, the crop canopy obscures crop rows and frustrates navigation of the vehicle between crop rows, such as by making it difficult to determine track-angle error and cross-track distance. In some examples, this can cause errors in agricultural vehicle guidance, which can result in wheels crossing through crop rows, crushing plants, and decreasing effective application of agricultural products or the processing of a field.

In some examples, agricultural vehicles include mechanical instruments, such as mechanical whiskers to detect crops or other plants. The mechanical whiskers are suspended below the vehicle on one or more arms, and extend laterally relative to the arms. The whiskers deflect when engaging plants while the vehicle moves through the rows. Deflection of the whiskers is indexed, and an indication provided to the operator to assist with steering. The suspended mechanical whiskers are subject to wear and damage because of their location (e.g., below or to the side of a vehicle) and the physical striking of plants against the whiskers needed for plant detection. Accordingly, in some examples, the whiskers are regularly repaired, replaced or serviced.

Further, if crops are irregularly planted, have grown away from whiskers or the like, the mechanical whiskers that rely on collision with plants and deflection in some examples fail to detect the crops. Additionally, in other examples mechanical whiskers detect other plants, such as weeds, in addition to crops and accordingly provide 'false positives' that frustrate accurate identification of crops, crop rows or the like.

Alternatively, as mechanical whiskers wear and break over time, an operator may elect to not repair the whiskers and instead resorts to visual navigation. Crop canopies, however, can cause visual navigation to be difficult. The crop canopy, varied growth, crop row curves or turns and irregular planting locations for crops frustrate the identification of crop rows, and accordingly the visually guided vehicle wanders between rows, crushes crops or poorly conducts its operation in the field. In still other examples, machine vision systems are used to supplement operator navigation. Cameras including video and still cameras view crops from above crop canopies and attempted to identify crop rows. As with operator visual identification, the crop canopy, varied growth, curves or turns in crop rows and irregular planting locations frustrate identification with these vision systems.

Aspects of the present disclosure provide a solution to these problems by providing an agricultural vehicle monitoring system that includes a comparative vehicle monitor configured to determine vehicle position based on contact free sensing and identification of crops. The system includes one or more noncontact sensors that each directs scan lines through crops, for instance across one or more crop rows. The reflection of the scan line is processed, such as to determine a vehicle position (e.g., vehicle location or heading) based on crops detected in the scan line and a specified row width. In an example, vehicle location or the vehicle heading is determined relative to one or more crop rows. In another example, vehicle heading is used to determine a vehicle location relative to the crops, for instance crop rows adjacent to features of the vehicle such as wheels.

The noncontact sensors detect one or more plants along a scan line, and the reflected scan line is interpreted with the comparative vehicle monitor to identify crops. In an example, a scan line can include an acoustic or electromagnetic signal that is transmitted from a noncontact sensor across one or more rows on crops and reflected, at varying degrees, off such crops. The time of flight and the amount of energy in the transmitted and or reflected signal can be analyzed to identify one or more crops that are in the path of the signal (e.g., along the scan line), and to determine distances between such crops. In fields including crop rows, the identified crops that are planted in rows, and thereby detected, with varied spacing along the scan line.

In one example, the spacing between the identified crops is determined from the scan line. In another example, such spacing is provided as a specified row width for the crop (e.g., input or determined from collected and averaged values). The comparative vehicle monitor, in either example, uses the crop spacing, the identified crops, and one or more other parameters to determine the vehicle position (e.g., vehicle location or vehicle heading) relative to one or more crops adjacent to the sensor or the vehicle. In various examples, these other parameters include a mounting angle at which a noncontact sensor is mounted on an agricultural vehicle, a wheel angle relative the chassis of the agricultural vehicle, such as determined by a wheel angle sensor, data provided by a roll sensor, or any other parameter or data that is useful for determining vehicle position. The comparative vehicle monitor uses the determined vehicle heading to determine the vehicle location relative to the crop. Identification and evaluation of one or more crops along scan lines are used to provide a frame of reference based on the crops and thereby accurately determine the vehicle location relative to the crops.

The noncontact sensors are provided at an elevation below the crop canopy, and in at least one example are not vision based. The scan line is accordingly not intercepted and scattered by the foliage of the crop canopy. Optionally, even where the scan line is intercepted by foliage the scan line is delivered laterally (e.g., parallel to the ground) and accordingly the scan line intercepts an edge profile of the foliage smaller than surface profiles of the foliage (turned toward the sun). Additionally, because vehicle position (heading, location or the like) is determined based on multiple crops detected along a scan line the crop rows, and variations in crop rows such as turns or the like, are rapidly detected and the vehicle correspondingly guided based on this detection. In contrast, other detection systems that detect adjacent crops in a row, or crops along an exposed edge require sufficient data points (e.g., detected crops in the row or along the edge) to indicate a line and identify the crop row or edge. Because the present system uses multiple detected objects along the scan line, determination of the vehicle position (location and heading) relative to a plurality of objects, such as crops in one or more rows, provides increased confidence in the identification of crops and crop rows, and accordingly improves position determination and corresponding guidance responsiveness.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
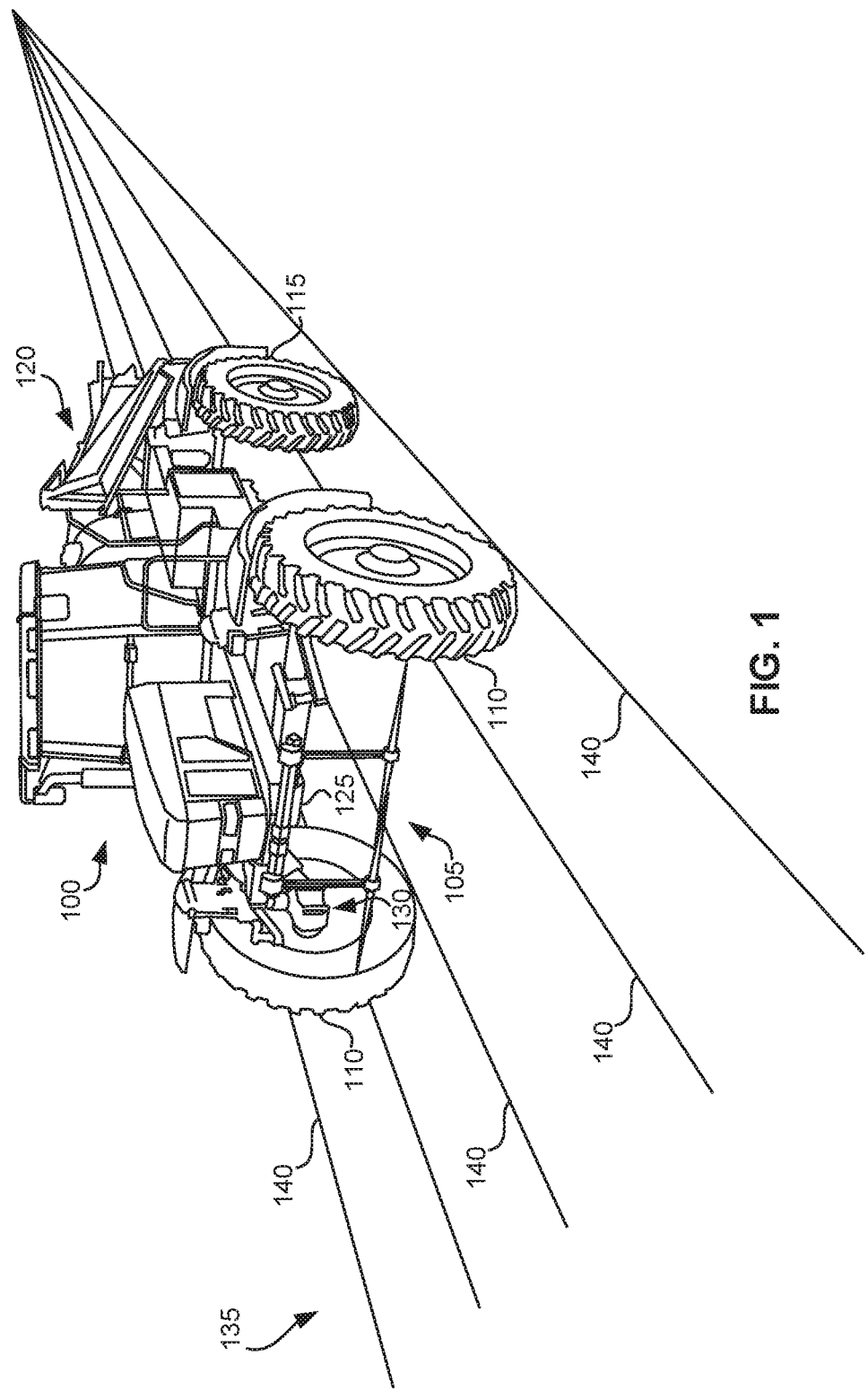
FIG. 1 is a diagram of an agricultural vehicle having a mechanical sensor system.

FIG. 1 is a view of an example of an agricultural vehicle 100 having a mechanical sensor 105. The agricultural vehicle 100 can include any vehicle or equipment that is configured to process a field, such as by planting, harvesting, or generally tending to a crop. Examples of such agricultural vehicles include tractors, planters, harvesters, irrigators, or fertilizers. As shown in FIG. 1, the agricultural vehicle 100 includes one or more ground engaging elements, such as front wheels 110 and rear wheels 115, and one or more agricultural implements, such as a sprayer boom 120. The ground engaging elements and the agricultural implements can each be coupled to the vehicle chassis 125 and may each be configured to actuate or articulate independently such chassis. In an example, the front wheels 110 are coupled to the chassis 125 though wheel assembly 130 and may be configured to articulate at one or more angles relative to the chassis. Similarly, the agricultural implement 120 can be coupled to the chassis 125 though an implement rack (not shown) and may be configured to independently extend, retract, fold, or rotate.

In some examples, the agricultural vehicle 100 includes a control module, such as a vehicle electronic controller unit (ECU) or other computing device, and one or more sensors, such as a visual sensor (e.g., a camera or other optical sensing device), a GPS sensor, and one or more angle or roll sensor. The visual sensor and the GPS sensor can each be coupled to the chassis 125 and configured to provide positional or navigation data that is usable by the control module to guide the agricultural vehicle 100 through the field 135. In an example, a GPS sensor can provide data that is indicative of the global position of the agricultural vehicle 100 in the field 135, while the visual sensors can provide more granular data that is useful for determining the position of the vehicle relative to crop rows 140.

Generally, the control module can use data provided by the aforementioned sensors to calculate the position of the agricultural vehicle 100, including, for example, calculating track-angle error and cross-track distances. However, as the crops that are disposed in crop rows 140 mature, foliage of these crops or other plants can create a canopy that obscures the field of view of visual sensors, thereby introducing errors or variances in the more granular position calculations of the control module. In these situations, additional sensors such as mechanical sensors 105 can be used to provide data that is useful for determining the location of crop rows 140 or the vehicle position of the agricultural vehicle 100 relative to these crop rows. The mechanical sensors 105 can extend down from the chassis 125 below the crop canopy to determine the location of crop rows 140 by direct engagement with the crops. Such direct engagement, however, can damage the crops and cause mechanical wear on the sensors, which may reduce the useful life of the sensor.

Figure 2A:
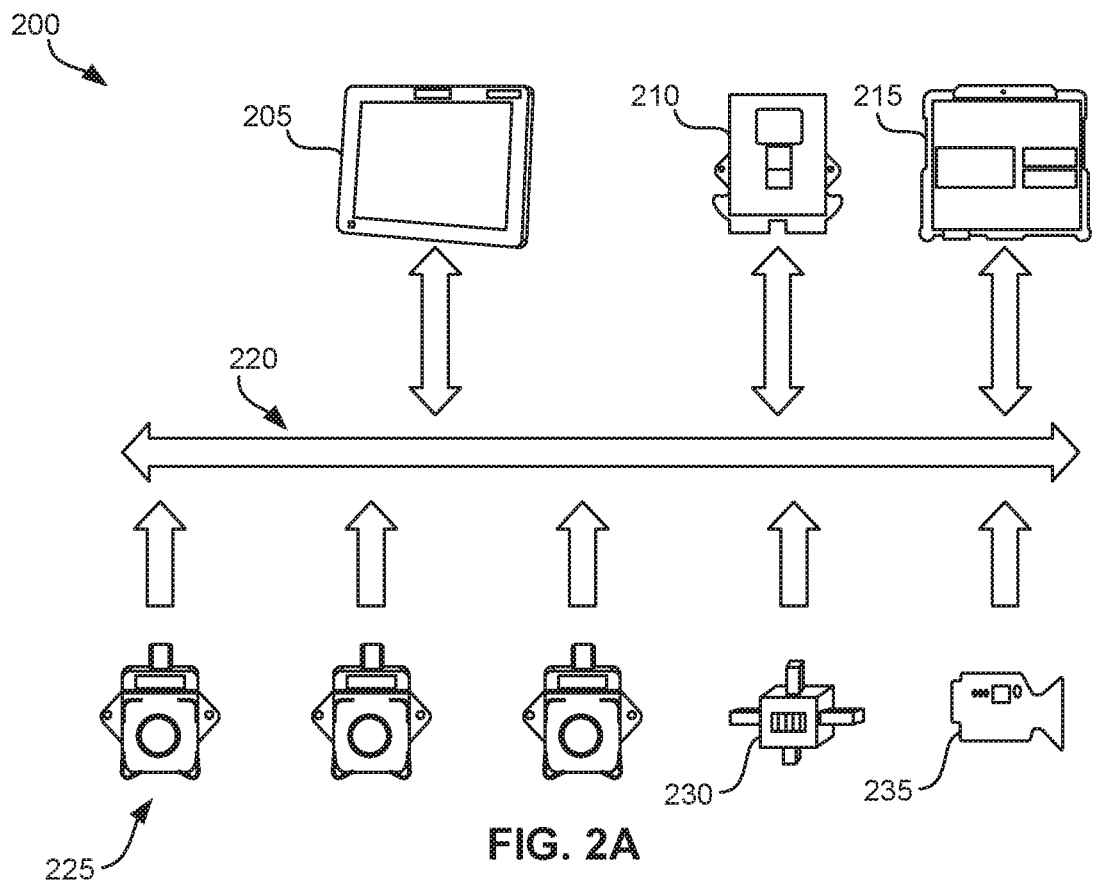
FIG. 2A is a diagram of an agricultural vehicle monitoring system.

FIG. 2A is a diagram of an agricultural vehicle monitoring system 200. The agricultural vehicle monitoring system 200 can be useful in any of the agricultural vehicle described herein, such as the agricultural vehicle 100 (FIG. 1), and can include interface 205, comparative vehicle monitor 210, steering interface 215, noncontract sensors 225, roll sensor 230, and visual sensor 235. In an example, the agricultural vehicle monitoring system 200 includes, or is, an example of the control module described in the discussion of FIG. 1. The components of the agricultural vehicle monitoring system 200 can include one or more hardware circuits or software application for performing one or more of the operations or techniques described herein. Additionally, the components of the agricultural vehicle monitoring system 200 can communicate or exchange data over a communication fabric 220, such as a controller area network bus (CAN bus) or other wired or wireless vehicle communication infrastructure.

In operation, the agricultural vehicle monitoring system 200 can receive data from one or more sensors, such as the noncontact sensor 225, roll sensor 230, or visual sensor 235. The received data can be used to identify one or more crops or crop rows, or to determine a vehicle position (e.g., a location or heading) of an agricultural vehicle. In an example, the agricultural vehicle monitoring system 200 can provide a determined vehicle position, such as in the form of a position of one or more vehicle wheels relative to a crop or a crop row, to an operator where it can be used to adjust the movement or guidance of an agricultural vehicle, such as to avoid or mitigate damage to crops. In another example, the agricultural vehicle monitoring system 200 can provide vehicle position to the steering interface 215 or other automated steering system to steer or guide an agricultural vehicle in a field, such as between crop rows or in furrows or row gaps.

The operator interface 205 can include one or more input or output devices, such as touchscreens, wireless device, smart phones, or any other computer interface that is configured to received or transmit instructions. In an example, the operator interface 205 provides steering cues or automated guidance directions based on a vehicle position determined by the agricultural vehicle monitoring system 200.

The steering interface 215 can include one or more control circuits or software applications that are configured to receive vehicle position data, such as from the agricultural vehicle monitoring system 200, and use this data to automatically steer or guide an agricultural vehicle along a path through a field. In an example, the steering interface 215 can steer an agricultural vehicle along a specified path or to a specified position within a furrow or a crop row gap. Such paths or positions can be in the middle of a crop row gap, or proximate to a first crop row and remote to a second crop row, such as to adjust for an inclined or declined terrain.

Noncontact sensors 225 can include one or more radar, ultrasound, light detection and ranging (LIDAR) sensor or other time of flight sensors. These noncontact sensors can be coupled to an agricultural implement or to the chassis, wheel, or wheel assembly of an agricultural vehicle to provide data that is useful to determine vehicle position relative to a crop or crop row. In an example, such data can be provided to supplement or enhance the confidence in other data used to determine vehicle position. In other examples, such data can improve the resolution of vehicle position determinations.

Roll sensor 230 can include one or more angular or inertial sensor that is configured to generate data that is useful for measuring or determining the orientation or yaw rate of an agricultural vehicle. In an example an inertial sensor can generate data this is useful for determining the roll of an agricultural vehicle (e.g., the orientation of the vehicle chassis), such as while the agricultural vehicle is traversing inclined or declined terrain. The data generated by the roll sensor 230 can be used to refine vehicle position determinations and to improve the resolution of corresponding vehicle guidance, such as mitigate damage to crops that are disposed on a side of a hill or in rows obscured by foliage.

The visual sensor 235 can include one or more video cameras or other optical sensors that are configured to provide data that is useful for local navigation or vehicle position determination of an agricultural vehicle, such as by enhancing the determination of vehicle position relative to a crop or crop row.

Figure 2B:
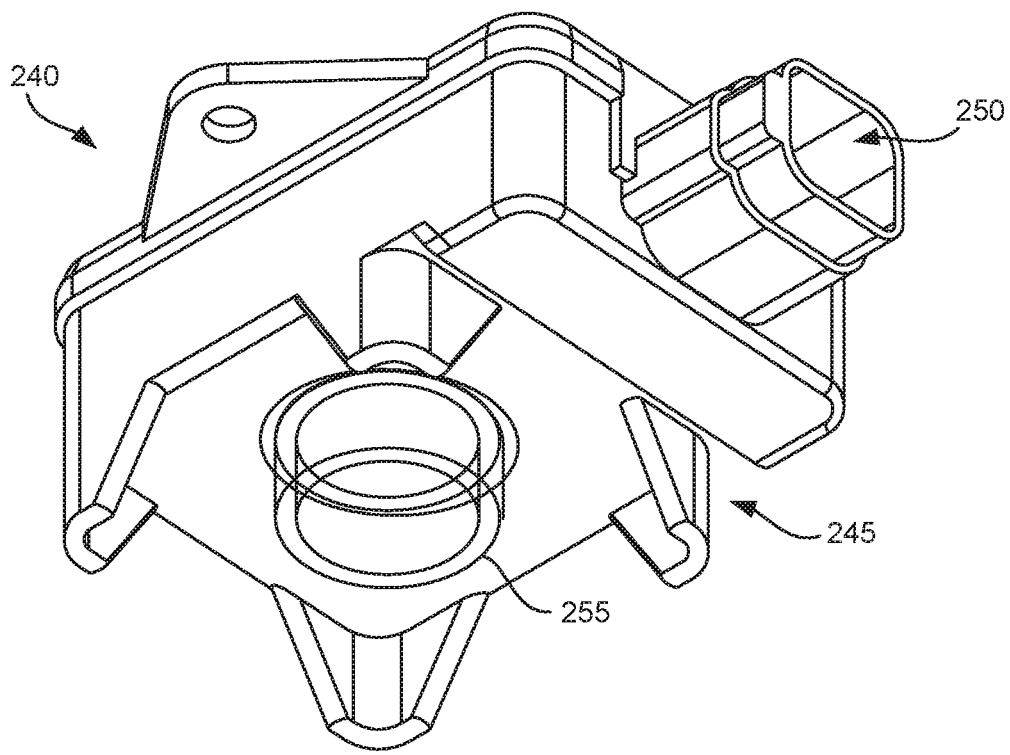
FIG. 2B is a diagram of a noncontact sensor.

FIG. 2B is a diagram of a noncontact sensor 240. The noncontact sensor 240 can include an example of the noncontact sensor 225, or any other sensor for remotely measuring distance to one or more objects. Noncontact sensor 240 can include a sensor housing 245, a power and data port 250, and a sensor emanator 255.

The sensor housing 245 can include any structure for encasing or housing the noncontact sensor 240, such as a case that is configured for mounting the noncontact sensor to an agricultural implement or an agricultural vehicle (e.g., the chassis, wheel, or wheel assembly of the agricultural vehicle). Such mounting can include coupling the noncontact sensor 240 to an agricultural vehicle or implement at a specified location above the ground or surface of a field but below the canopy of a crop.

The power and data port 250 can include one or more electrical, optical, or electromagnetic terminals that are configured to interface with a power supply and one or more components of the agricultural vehicle monitoring system 200, such as the comparative vehicle monitor 210. The noncontact sensor 240 can relay data that is indicative of sensor measurements and sensor confidence to the comparative vehicle monitor 210, such as by way of wired connection at the power and data port 250 or a wireless interface coupled at the power and data port.

The sensor emanator 255 can include an opening in the sensor housing 245, such as for transmitting (e.g., emitting) or receiving a sensor energy or sensor signals (e.g., a scan line signal). In an example, the sensor emanator 255 includes one or more sensor elements (e.g., a scan line generator), such as radar, light, ultrasound generating elements, that are configured to generate a corresponding energy (e.g., an electromagnetic, optical, or mechanical signal) and direct the energy toward objects of interest (e.g., stalks of one or more crops). In an example, such energy is directed perpendicular to objects of interest and parallel to the field or ground. In another example, such energy is directed in any direction that traverses (e.g., crosses or moves through) objects of interests. The sensor emanator 255 can also include a receiver (e.g., a scan line receiver) configured to receive reflected energy after engagement with objects of interest and convert the reflected energy into a signal, such as a signal corresponding to either of a crop or a row distance. In an example, a separate receiver is proximate to the noncontact sensor 240 and receives the reflected energy and converts the energy into the signal.

The sensor emanator 255 can include two or more sensor elements, each calibrated to measure the distance to an object, such as stalks of one or more plants. Optionally, the sensor emanator 255 includes a ping element, such as a radar generator, configured to emit radio frequency energy that partially reflects from a first object, such as a first crop stalk, and reflects from additional objects, such as other crop stalks disposed, relative to the sensor emanator 255, behind the first crop stalk. The reflected energy can be interpreted, such as at the sensor 240, and provided, such as to the comparative vehicle monitor 210, as a signal indicating distance measurements to a one or more objects.

Figure 3:
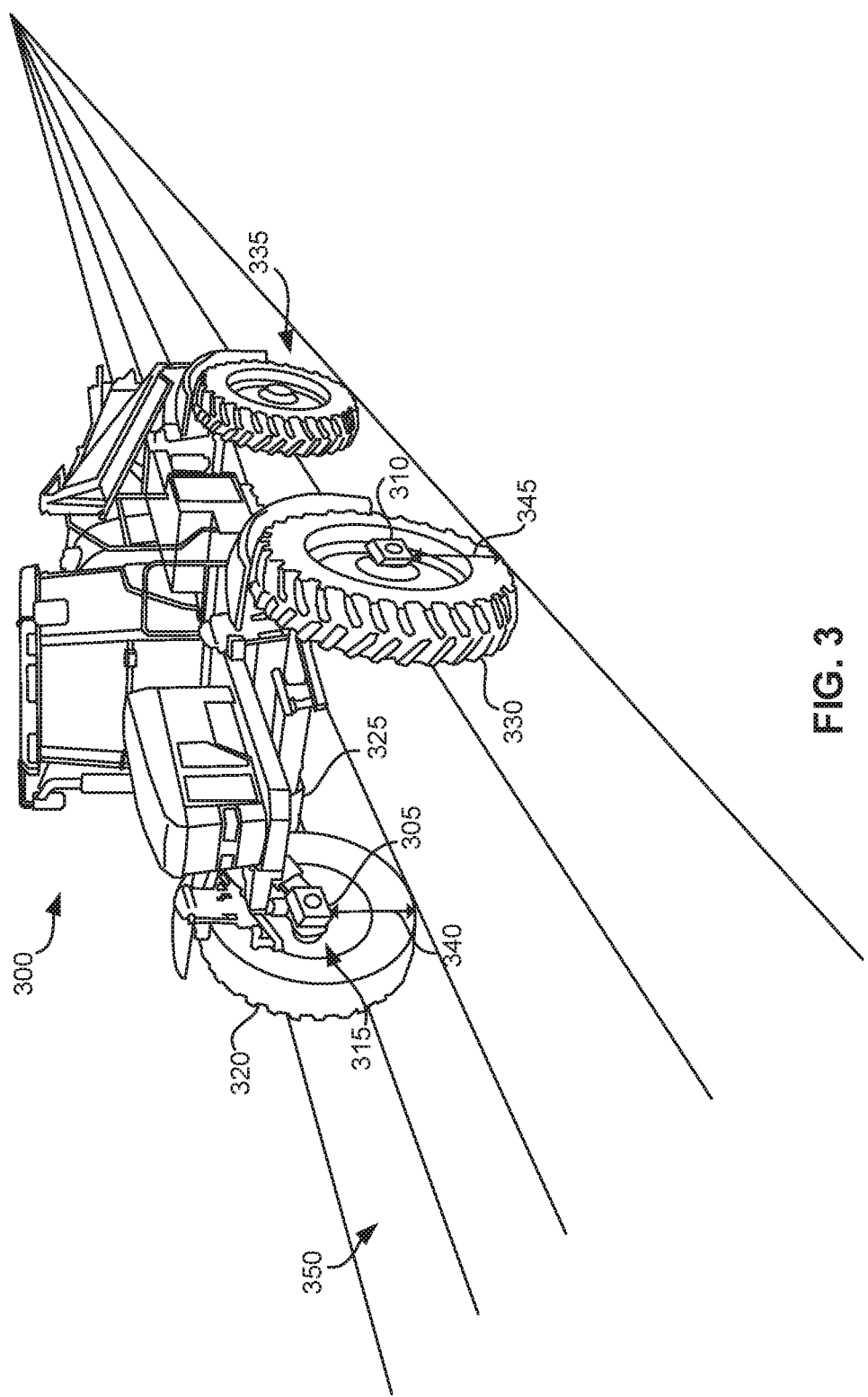
FIG. 3 is a diagram of noncontact sensors coupled to a wheel base of an agricultural vehicle.

FIG. 3 is a diagram of a vehicle 300 (here an agricultural vehicle) including noncontact sensors coupled to a wheel of the vehicle. The agricultural vehicle 300 can include an example of the agricultural vehicle 100, as shown in FIG. 1, where the mechanical sensors 105 are replaced by the noncontact sensors 305 or 310. The noncontact sensors 305 and 310 can include examples of the noncontact sensor 225 (FIG. 2A) or the noncontact sensor 240 (FIG. 2B).

As shown in FIG. 3, one or more noncontact sensors 305 can be coupled to a wheel assembly 315 of the wheel 320. In example, the noncontact sensor 305 is configured (e.g., oriented) to generate a scan line signal in a direction towards wheel 330, such as to detect crops or crop rows under the chassis 325. In another example, the noncontact sensor 305 is configured (or oriented) to generate a scan line (e.g., a scan line signal) in a forward oriented direction, such as towards the front of the chassis 325 or towards the front of the wheel 330 (or any other wheel of agricultural vehicle 300). The scan line can be used to detect crops or crop rows ahead of the agricultural vehicle 300. In another example, the noncontact sensor 305 includes two distinct noncontact sensors or a single noncontact sensor having two sensor emanators and receivers. A first sensor emanator, or a first noncontact sensor, can be directed in a direction towards the wheel 330 or in a forward direction towards the front of the chassis 325 or the front of the wheel 330. Such a configuration can be useful for generating two or more scan lines which originate at a single location and are directed in a forward oriented direction and in a rearward (or aft or backward) oriented direction. Such scan lines can be useful for determining vehicle position using scan line data generated from a single crop row, as described herein. In another example, the wheel 330 includes a noncontact sensor disposed in any of the previously discussed configurations.

A noncontact sensor, such as the noncontact sensor 310, can be coupled to the outside of the wheel 320 or the wheel 330, such as to generate scan lines on opposing sides of the agricultural vehicle 300.

The noncontact sensor 305 or 310 can be coupled to the wheel 320 or 330 at a height 340 or 345 above the field 350, such as by coupling the sensors at a location that is offset from the center of the wheels 320 and 330. In an example, height 340 or 345 is lesser than a height crop canopy formed by crops in the field 350.

In an example, noncontact sensors, such as the noncontact sensors 305 or 310, can be coupled to the rear wheels 335 in any of the previously discussed configurations.

Figure 4:
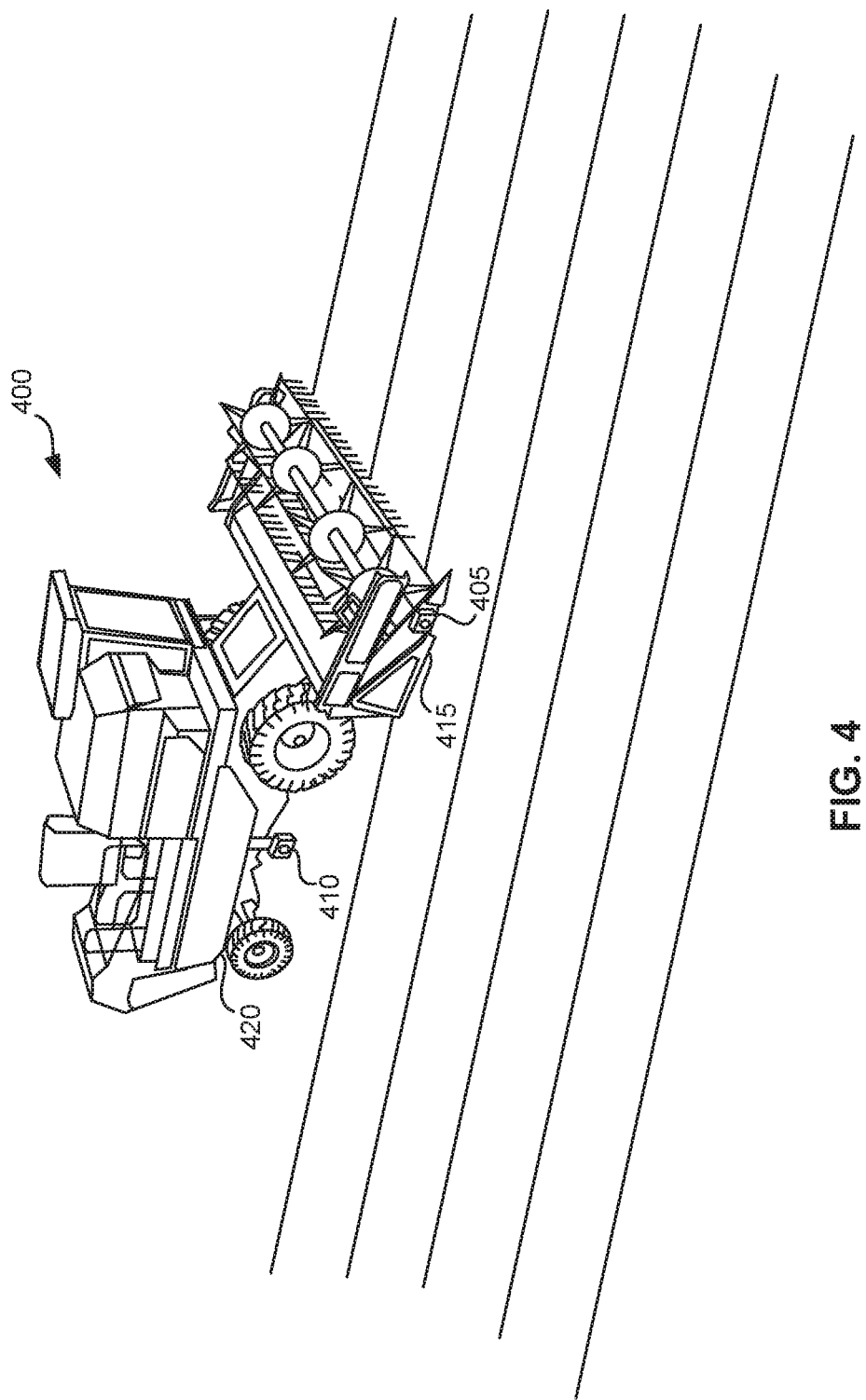
FIG. 4 is a diagram of noncontact sensors coupled to a chassis and an agricultural implement of an agricultural vehicle.

FIG. 4 is a diagram of an example of noncontact sensors 405 and 410 coupled, respectively, to an agricultural implement 415 and a chassis 420 of an agricultural vehicle 400. The agricultural vehicle 400 can include an example of the agricultural vehicle 300, as shown in FIG. 3. As shown in FIG. 4, the noncontact sensors 405 and 410 are oriented to generate scan lines to detect crops or crop rows that are proximate to the agricultural vehicle 400 or the agricultural implement 415. The returned scan line data (e.g., energy, timing, or object distance data) or crop row distance data from the noncontact sensors 405, 410 installed at these locations is used, as described herein, in determining the position of the agricultural vehicle 400 or the implement 415 relative to a crop or a crop row.

Figure 5:
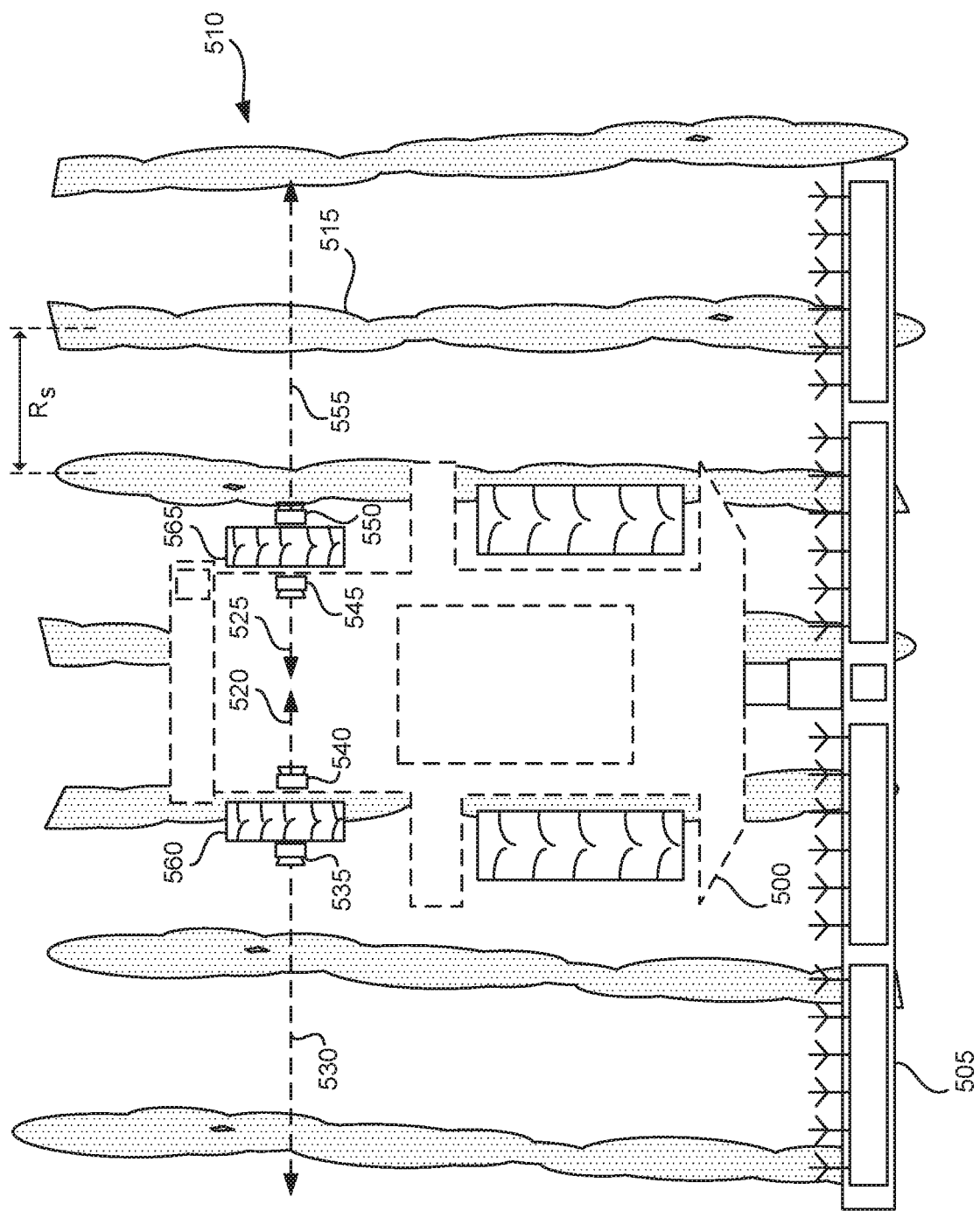
FIG. 5 is a diagram of configurations of noncontact sensors on an agricultural vehicle.

FIG. 5 is a diagram of configurations of noncontact sensors on an agricultural vehicle 500. The agricultural vehicle 500 optionally includes components (e.g., sprayer booms, sprayer nozzles or the like) similar to the agricultural vehicle 300 shown in FIG. 3. For instance, the vehicle 500 includes an agricultural implement 505, such as the agricultural implement 120 (e.g., a sprayer). In an example, the agricultural vehicle 500 is configured to process a field 510, such as applying an agricultural produced using the agricultural implement 505. As shown in FIG. 5, the field 510 includes one or more crop rows 515 with foliage (indicated by the stippled zones). Foliage includes, but is not limited to, leaf collars, crop canopy, weeds, silk or the like. Foliage, in some examples, obscures identification of crops or crop rows (e.g., the center of the crop rows for instance corresponding to stalks of the crop).

As shown in FIG. 5, the agricultural vehicle 500 includes one or more noncontact sensors. In the example shown, the vehicle 500 includes noncontact sensors 535, 540, 545, or 550. The sensors are directed laterally (e.g., transverse to the crop row orientation, perpendicular, at angles relative to the crop row or forward direction of the vehicle, orthogonally or the like) relative to agricultural vehicle 500. The sensors, in other examples, are directed forward or backward relative to the front of the agricultural vehicle 500. In each of these examples, the sensors are directed laterally (e.g., at an angle relative to the front of the vehicle, forward direction of the vehicle, direction of the crop rows or the like).

The sensors are coupled or mounted proximate the wheel assemblies of the agricultural vehicle 500. In a first example, the sensor 540 or 545 is oriented inward (e.g., another example of lateral orientation) under the chassis towards the wheel 560 or the wheel 565, and generates inward directed scan lines 520 or 525. In another example the sensor 535 or 550 is directed away from the agricultural vehicle 500 (another example of lateral orientation), and generates outward directed scan lines 530 or 555. In each of these configurations, scan lines are delivered laterally relative to the heading of the vehicle, in a forward or rearward oriented direction relative to the front of the vehicle (another example of lateral direction). The sensors and their associated scan lines detect portions of crops or crop rows below the crop canopy, or that present a smaller leaf profile to the sensors than a leaf profile presented by the crop canopy.

In the configuration where the noncontact sensors 540 or 545 are directed inward under the vehicle chassis, the sensors and associated scan lines (by way of the returned scan line data) detect the opposed wheel and one or more intervening crop rows (e.g., the distances to, or the positions of, the crop rows) along the scan line 520 or 525. As described herein, the scan line data from the noncontact sensors 540, 545 is used, along with a known mounting position of the noncontact sensors (e.g., the sensor mounting angle), to enhance guidance of the agricultural vehicle 500. For instance, the noncontact sensors and the associated control systems described herein facilitate the guidance of the vehicle wheels to specified positions (e.g., symmetrically or biased toward a side of the row if on a grade) between crop rows as the vehicle traverses the field 510. The guidance provided by way of the noncontact sensors and the associated control system reduces (e.g., decreases or eliminates) contact with the crop rows 515, thereby reducing overrunning or damaging such crops. The noncontact sensors 535 and 545 can similarly provide scan line data that is indicative of one or more crops or crop rows, such as crops or crop rows that are disposed proximate to the agricultural vehicle 500. Such crop rows can be separated by row spacing $R_s$. In some examples, the row spacing $R_s$ is a distance between the center line of two adjacent crop rows. In certain examples Rs is substantially constant for crops in a field.

In some examples, scan line data generated by noncontact sensors 535, 540, 545, or 550 is optionally filtered. As described herein, filtering includes one or more of removing noise caused by weeds or other plants beyond the crop, or removing values outside of a specified or calculated threshold value, such as crop row width. In other examples described herein, data generated along scanlines 520 and 525 or along scan lines 530 and 555 is weighted and combined according to a specified crop row width, or a crop row width calculated using scan line data. In certain examples also described herein, scan line data generated from two opposing noncontact sensors is compared according to a statistical central tendency of the scan line data or according to a specified or calculated crop row width, and the result of such comparison can be used to select a sensor or scan line data to determine a vehicle position or for vehicle guidance.

Figure 6:
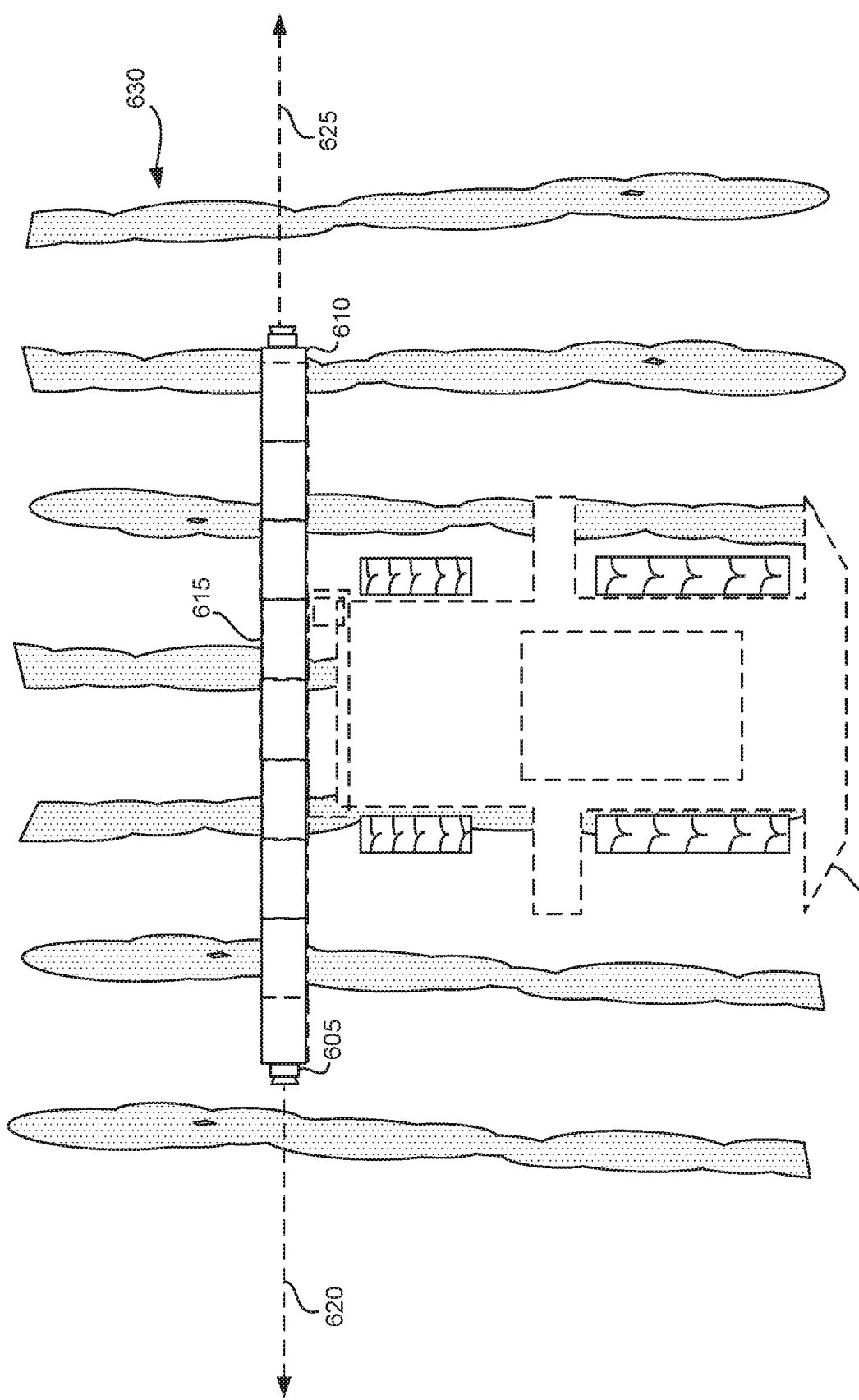
FIG. 6 is a diagram of an agricultural vehicle that is configured with an agricultural implement that includes noncontact sensors.

FIG. 6 is a diagram of an example of an agricultural vehicle 600 that is configured with an agricultural implement 615 that includes noncontact sensors 605 and 610. The agricultural vehicle 600 can include an example of any of the vehicles described herein. As shown in FIG. 6, the noncontact sensors 605 and 610 are configured to generate lateral scan lines 620 and 625 on opposing sides of the implement 615. Scan line data generated according to one or more of these scan lines 620, 625 are used to determine the position of the implement 615 or the position of agricultural vehicle 600 relative to the crops or crop rows 630, as will be described herein.

Figure 7A:
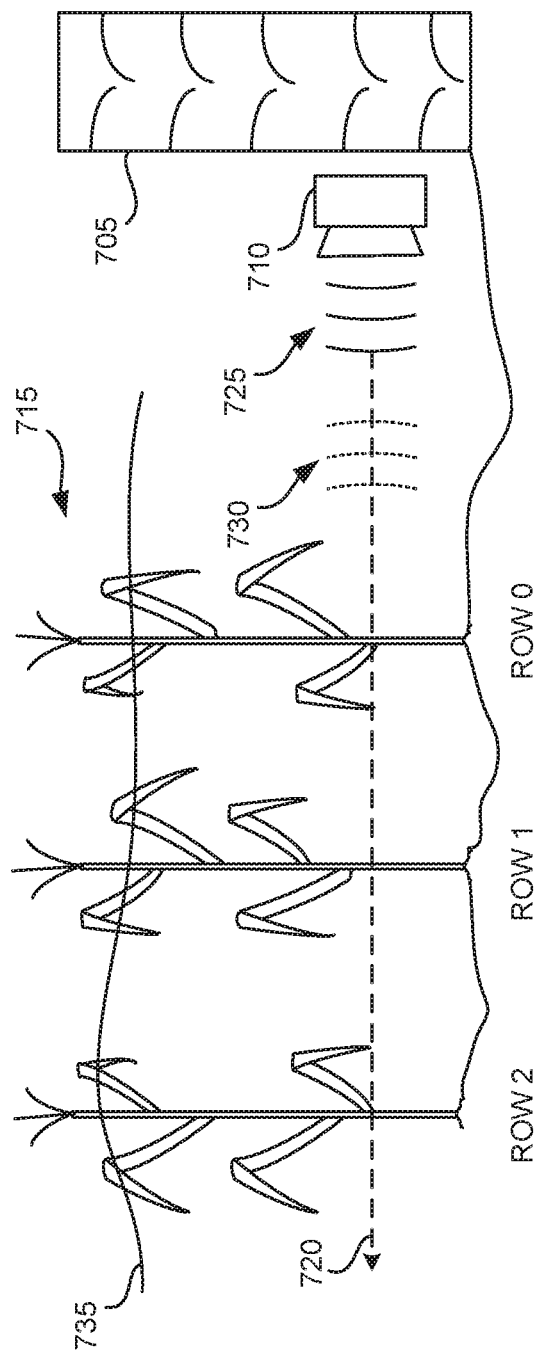
FIG. 7A is a diagram of a noncontact sensor directing a scan line through crop rows.

FIG. 7A is a diagram of a noncontact sensor 710 directing a scan line 720 through one or more crop rows 715. The noncontact sensor 710 can be coupled to a wheel 705 or to the chassis of any of the agricultural vehicles described herein. In an example, the noncontact sensor 710 is coupled to the wheel assembly of the wheel 705 and can rotate according to a rotation (e.g., a change in yaw) of the wheel 705. In another example, the noncontact sensor 710 is coupled to the chassis of the agricultural vehicle and is substantially static relative to the vehicle. In either case, the noncontact sensor 710 is coupled to the agricultural vehicle at a position below the foliage (e.g., weeds, leaves or leaf collars) forming the canopy 735. In some examples, the scanline 720 is generated by transmitting a scan line signal 725 from the noncontact sensor 710 across the one or more crop rows 715 (e.g., Row 0-2). The returned scan line signal 730 can then be detected and processed, such as by the agricultural vehicle monitoring system 200 (FIG. 2), to identify the one or more crop rows 715 or to determine the distance of the crop rows from the noncontact sensor 710. In an example, the returned scan line signal includes at least a portion of the transmitted scan line signal that is reflected by an object, such as a crop or a wheel.

Figure 7B:
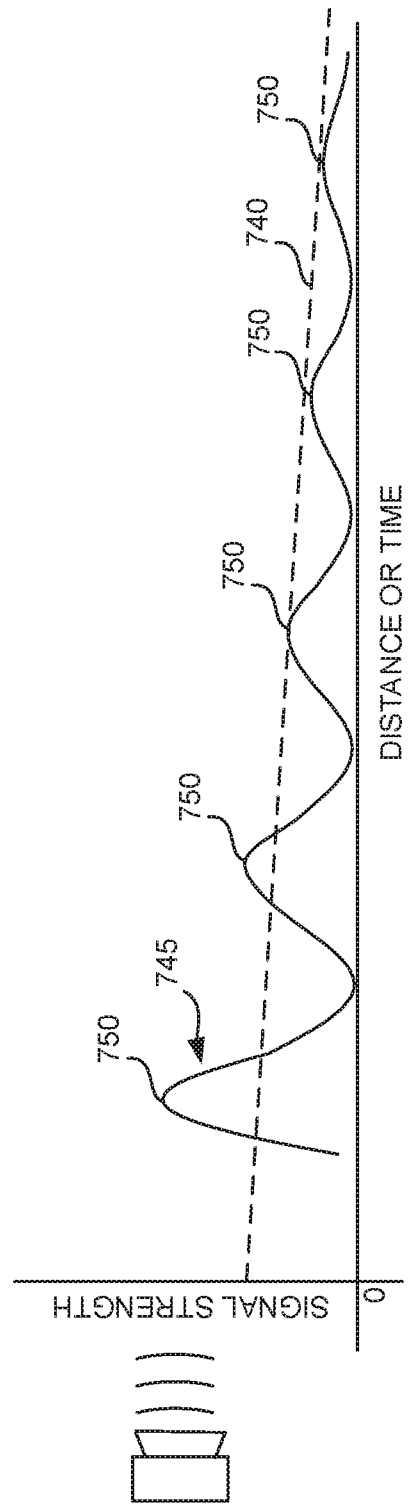
FIG. 7B is a diagram of a plot of a reflected scan line signal generated by a noncontact sensor.

FIG. 7B is a diagram of a plot of a returned scan line signal 745, such as a signal generated by noncontact sensor 710 (FIG. 7A). In an example, FIG. 7B shows a plot of the detected energy (e.g., the magnitude of the energy) of the returned scan line signal 745, such as the energy sensed at the noncontact sensor 710, as a function of time (e.g., time of flight of the transmitted and returned scan line signal 745). In another example, FIG. 7B shows a plot of the detected energy in the returned scan line signal 745 as a function of distance, such as a distance from the noncontact sensor 710 (e.g., calculated from the time of flight of the transmitted and returned scan line signal 745). Generally, the amplitude or the peaks 750 (e.g., the peaks of the amplitude plot) of returned scan line signal 745 is indicative of one or more crops, weeds, or intervening obstacles. In some examples, the amplitude or peaks 750 of the returned scan line signal 745 attenuates based on distance from the noncontact sensor 710, for instance due to signal scattering or absorption.

In some examples, a signal energy amplitude threshold 740 (e.g., a row threshold) is used to identify crop rows (e.g., the signal peaks 750) from the returned scan line signal 745. The threshold 740 is optionally specified by an operator or a control system, such as the agricultural vehicle monitoring system 200. In certain examples, the threshold 740 corresponds to a crop characteristic, such as stalk width. In other examples, the threshold 740 is a dynamic threshold. The dynamic threshold can be determined according to characteristics of the returned scan line signal 745, such as inflection points (e.g., a change in the plot from a positive slope to a negative slope), evaluation of the largest amplitude within a specified plot window (e.g., time or distance window). The dynamic threshold can also be determined according detected or provided row widths, a position of a crop row (e.g., crop row number), or distance from an agricultural vehicle to a crop row (e.g., such as indicated by the slope of the threshold 740).

In certain examples the amplitude of the reflected scan line peaks after attenuating over a certain distance, for instance due to reflection of the transmitted scan line signal from a highly reflective opposing feature or a feature with a large surface area relative to a crop stalk (e.g., an opposing wheel of an agricultural vehicle). In such examples, the opposing feature is optionally used as an origin for determining position or distance to avoid deadbands (between a sensor and an adjacent wheel) that inhibit detection of objects within close range of the noncontact sensor 710 (within the deadband).

Figure 8A:
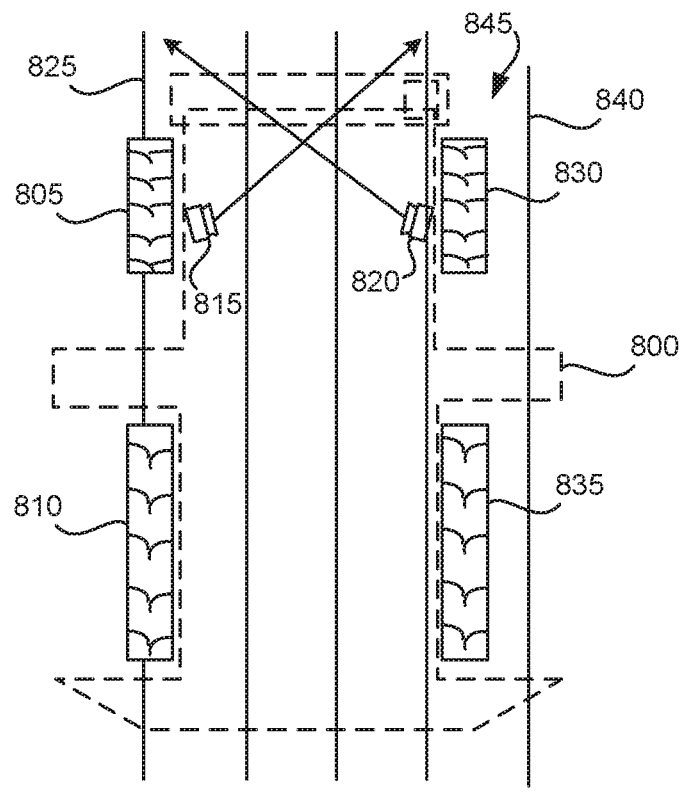
FIG. 8A is a diagram of an agricultural vehicle navigating an initial path though crop rows.

FIG. 8A is a diagram of an example of an agricultural vehicle 800 navigating an initial path though crop rows. As shown in FIG. 8A, left wheels 805 and 810 are positioned over the crop row 825, indicating that the agricultural vehicle 800 might crush or damage crops in the crop row. Similarly, right wheels 830 and 835 are positioned in close proximity to the crop row 840, off the center of the row gap 845. The noncontact sensors 815 and 820 (e.g., scan line generators) are directed at least partially forward, thereby looking ahead of the agricultural vehicle 800 to detect oncoming obstacles, such as crops. In an example, the noncontact sensors 815 and 820 are coupled to the vehicle chassis. In another example, the noncontact sensors 815 and 820 generate scan line data that is indicative of the location (or anticipated location because of a partially forward orientation) of the agricultural vehicle 800 as the vehicle continues along the initial path. The scan line data is used, such as by the agricultural vehicle monitoring system 200, to determine an adjusted path for the agricultural vehicle 800 according to one or more of the techniques described herein.

Figure 8B:
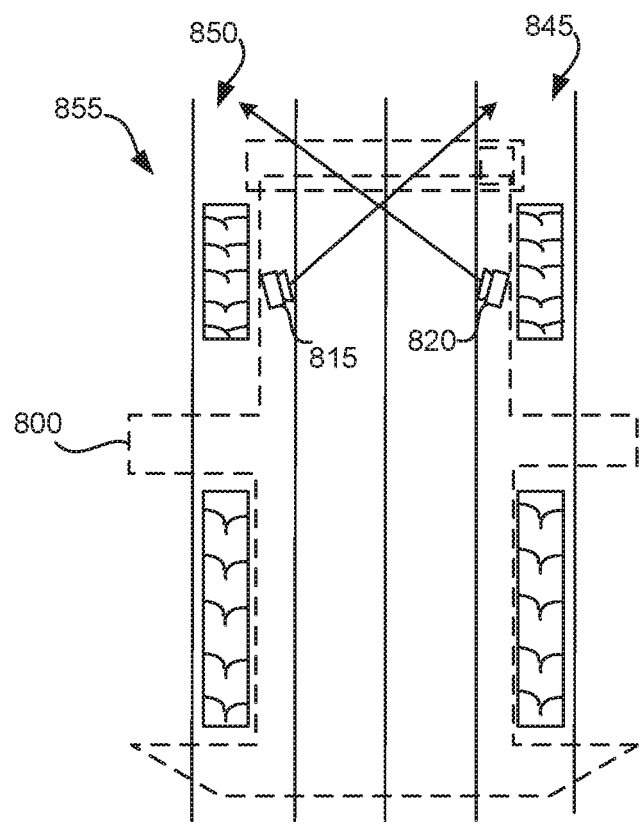
FIG. 8B is diagram of an agricultural vehicle navigating an adjusted path though crop rows.

FIG. 8B is a diagram of an example of the agricultural vehicle 800 navigating an adjusted path through crop rows. The adjusted path is generated with the systems and methods described herein, and as shown, guides the agricultural vehicle 800 toward a specified position, such as toward the center of row gaps 845 and 850. In some examples, the path or position of the agricultural vehicle 800 is continuously monitored or measured, such as by agricultural vehicle monitoring system 200, using scan line data generated by the noncontact sensors 815 and 820 and adjusted as the vehicle traverses the field 855.

Figure 9:
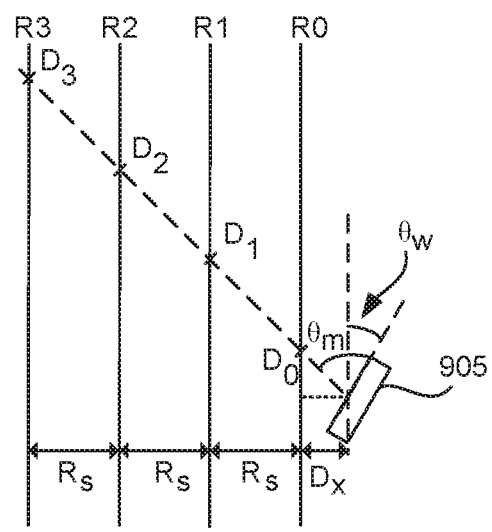
FIG. 9 is an example of a diagram that is useful in a technique for determining a position of an agricultural vehicle according to a scan line associated with the vehicle at a location proximate to a crop row.

FIG. 9 is an example diagram that is useful in a technique for determining a position of an agricultural vehicle according to a scan line associated with the vehicle at a location proximate to a crop row. This technique is used to determine the distance $D_x$ of a vehicle element 905 (e.g., an agricultural implement, or an agricultural vehicle wheel or chassis) from the crop row R0 (e.g., the crop row closet to a noncontact sensor coupled to the vehicle element) and the angle $\theta_x$ of the vehicle element relative to the crop row R0 (e.g., a wheel or vehicle orientation relative to a crop row).

In the example shown in FIG. 9, a noncontact sensor provides distance measurements D0-D3 (e.g., a scan line or scan line data) of distances from the vehicle element 905 (e.g., a noncontact sensor coupled to the vehicle element) to rows R0-R3, respectively. In some examples, the distance measurements D0-D3 are provided simultaneously, such as in a single transmission or communication from the noncontact sensor. The distance $D_x$ and the angle $\theta_w$ are determined, in one example, using equations (1) and (2), along with known values for the crop row spacing $R_s$, the noncontact sensor mounting angle $\theta_m$ measured relative to the vehicle element 905 (e.g., a ground engaging element such as a wheel, an implement or the chassis), and scan line data collected by the noncontact sensor.

$$D_x = \frac{R_s(iD_j - jD_i)R_s}{D_j - D_i} \quad (1)$$

$$\theta_w = -90° + \theta_m + \cos^{-1}\frac{iR_s + D_x}{D_i} \quad (2)$$

The values of $\theta_m$ and $R_s$ can be provided during calibration or from direct user input. The variables $D_i$ and $D_j$ represent are the distances from the vehicle element 905 to adjacent rows $R_i$ and $R_j$. In a particular example, $R_s$ is estimated from the scan line data provided by the noncontact sensor.

In an example calculation where the scan line data indicates that $D_2$ and $D_3$ are, respectively, 63.6 and 106.1 inches, Rs and $\theta_m$ are provided, respectively, as 30 inches and 45 degrees, evaluating equations (1), and (2) yields a $D_x$ of 14.97 inches and a $\theta_w$ of 0 degrees. In another example where the scan line data indicates that $D_2$ and $D_3$, respectively, are 78.45 and 130.8 inches, $R_s$ and $Q_s$ are provided, respectively, as 30 inches and 45 degrees, evaluating equations (1), and (2) yields a $D_x$ of 15 inches and a $\theta_w$ of 10 degrees, indicating that the vehicle element 905, or sensor angle, is rotated 10 degrees from the previous example.

Figure 10A:
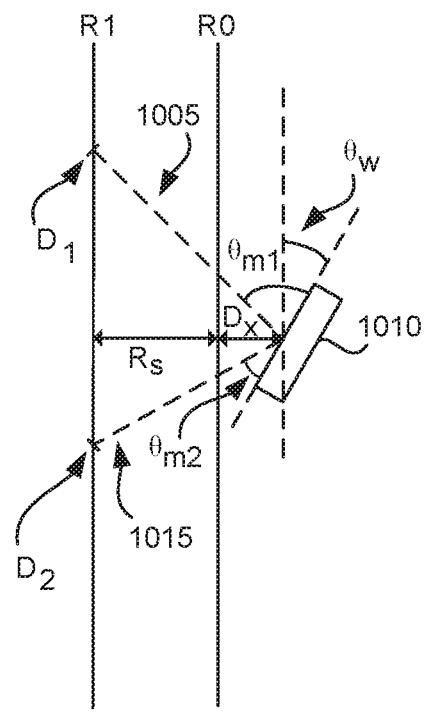
FIG. 10A is an example of a diagram that is useful in a technique for determining a vehicle position of an agricultural vehicle according to two scan lines associated with an agricultural vehicle at a location proximate to a crop row.

FIG. 10A is an example diagram useful in a technique for determining a position of an agricultural vehicle according to two scan lines 1005 and 1015 associated with an agricultural vehicle at a location proximate to a crop row. In an example, the scan lines 1005 and 1015 are generated by a single noncontact sensor configured to generate forward and rearward (e.g., aft) oriented scan lines that also include lateral direction components. In another example, the scan lines 1005 and 1015 are generated by at least two noncontact sensors mounted at substantially the same location on the vehicle element 1010, such that a first sensor of the at least two sensors is oriented in a forward (and lateral) direction and a second sensor of the at least two sensors is oriented in a rearward or aft (and lateral) direction. As described herein, the noncontact sensor collects and delivers data that is indicative of the distance $D_1$ from the vehicle element 1010 to crop row R1 along the forward oriented scan line 1005 and the distance $D_2$ from the vehicle element to the crop row $R_s$ along the rearward oriented scan line 1015. The row width $R_s$ and the noncontact sensor mounting angles $\theta_{m1}$ and $\theta_{m2}$ are obtained through calibration or from user input, as described herein. The distance $D_x$ from vehicle element 1010 to the crop row R0 and the angle $\theta_w$ of the vehicle element relative to the crop row R0 can be determined according to equations (3), (4) and (5):

$$D_x = \frac{D_1 D_2 \sin(180° - \theta_{m1} - \theta_{m2})}{\sqrt{D_1^2 + D_2^2 - 2D_1 D_2 \cos(180° - \theta_{m1} - \theta_{m2})}} \% R_s \quad (3)$$

$$\theta_w = 90° - \theta_{m2} - \cos^{-1}\left(\frac{D_1 \sin(180° - \theta_{m1} - \theta_{m2})}{\sqrt{D_1^2 + D_2^2 - 2D_1 D_2 \cos(180° - \theta_{m1} - \theta_{m2})}}\right) \quad (4)$$

$$\theta_w = 90° + \theta_{m1} - \cos^{-1}\left(\frac{D_2 \sin(180° - \theta_{m1} - \theta_{m2})}{\sqrt{D_1^2 + D_2^2 - 2D_1 D_2 \cos(180° - \theta_{m1} - \theta_{m2})}}\right) \quad (5)$$

where $\theta_{m1}$ and $\theta_{m2}$ are the mounting angles of the one or more noncontact sensors, and the remaining variables are obtained or defined as previously described herein.

Figure 10B:
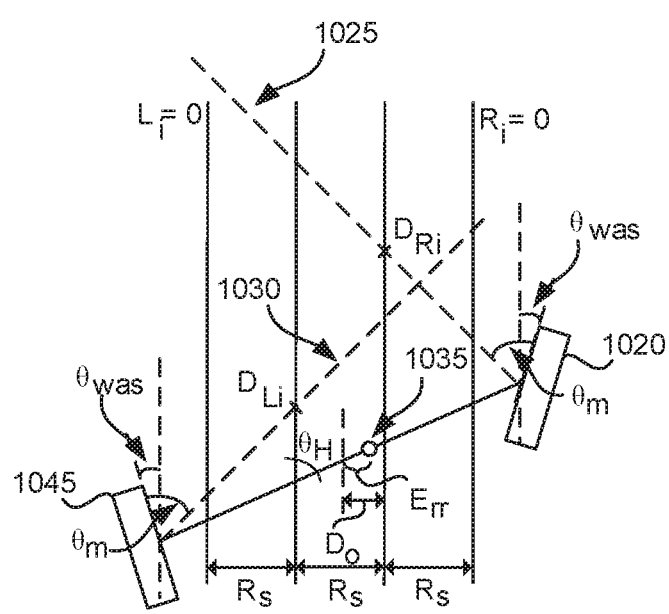
FIG. 10B is an example of a diagram that is useful in a technique for determining a vehicle position of an agricultural vehicle according to two scan lines generated from two wheels of an agricultural vehicle.

FIG. 10B is an example diagram useful in a technique for determining a vehicle position of an agricultural vehicle according to two scan lines generated from two opposing vehicle elements, such as wheels 1020 and 1045 (other example vehicle elements include implement components, portions of the chassis or ground engaging elements like the wheels, tracks or the like) of an agricultural vehicle. The agricultural vehicle includes, but is not limited to, the vehicles described herein. In an example, the vehicle position of the agricultural vehicle (e.g., one or more of the location or orientation of the agricultural vehicle relative to a crop row) is determined as an offset error distance $E_{rr}$ of a specified point 1035 (e.g., an index marker, fiducial marker or the like) on the agricultural vehicle from a target offset $D_o$. In one example, the target offset $D_o$ includes a specified offset from a crop row (e.g., a distance from the centerline of a crop row). In another example, the vehicle position of the agricultural vehicle is determined as a heading error $\theta_H$ of the vehicle relative to a crop row. In an example, the specified point 1035 is a center point of the chassis between a right wheel 1020 and a left wheel 1045, and the target offset $D_o$ corresponds to a distance from a crop row (e.g., crop row R1 or crop row L2) to a point or position at a center line between crop rows (e.g., a center line between crop rows L1 and L2 or, equivalently, a center line between R1 and R2). Optionally, the target offset $D_o$ is varied, for instance based on a roll angle of the vehicle.

In an example, this technique is used to guide an agricultural vehicle along a path at a specified offset (e.g., $D_o$) from a crop row (e.g., a center line of a crop row). According to this technique, the offset error $E_{rr}$ and the heading error $\theta_H$ are determined using a mounting angle $\theta_m$ of the noncontact sensors mounted to the wheels 1020 and 1045, the wheelbase width of the agricultural vehicle (e.g., the distance between the wheel 1020 and the wheel 1045), a known or determined crop row spacing Rs, a target offset $D_o$, and wheel angle sensor readings $\theta_{was}$. In an example the offset error $E_{rr}$ and the heading error OH are determined using equations (6), (7), and (8):

$$E_{rr} = \quad (6)$$
$$(D_w \% r_s + 2ir_s + 2D_o)\frac{[D_L\cos(\theta_{was} + \theta_m)]^2 - [D_R\cos(\theta_{was} - \theta_m)]^2}{D_L D_R \cos(\theta_{was} + \theta_m)\cos(\theta_{was} - \theta_m)} +$$
$$D_R[\tan(\theta_{was} + \theta_m) - \sin(\theta_{was} - \theta_m)] + D_L[\tan(\theta_{was} - \theta_m) - \sin(\theta_{was} - \theta_m)]$$

$$\theta_H = \tan^{-1}\left(\tan(\theta_{was} - \theta_m) - \frac{D_w \% R_s + 2iR_s + 2D_o + E_{rr}}{D_R \cos(\theta_{was} - \theta_m)}\right) \quad (7)$$

$$\theta_H = \tan^{-1}\left(\tan(\theta_{was} + \theta_m) - \frac{D_w \% R_s + 2iR_s + 2D_o - E_{rr}}{D_L \cos(\theta_{was} + \theta_m)}\right) \quad (8)$$

where, $D_R$ and $D_L$ are distances to adjacent crop rows as measured relative to the right wheel 1020 and the left wheel 1045 (e.g., distances along scan line 1025 and 1030), respectively, and $D_o$ is specified at calibration, through user input or optionally changes, for instance according to vehicle roll angle. The remaining variables can be obtained or defined as previously described herein.

Figure 11:
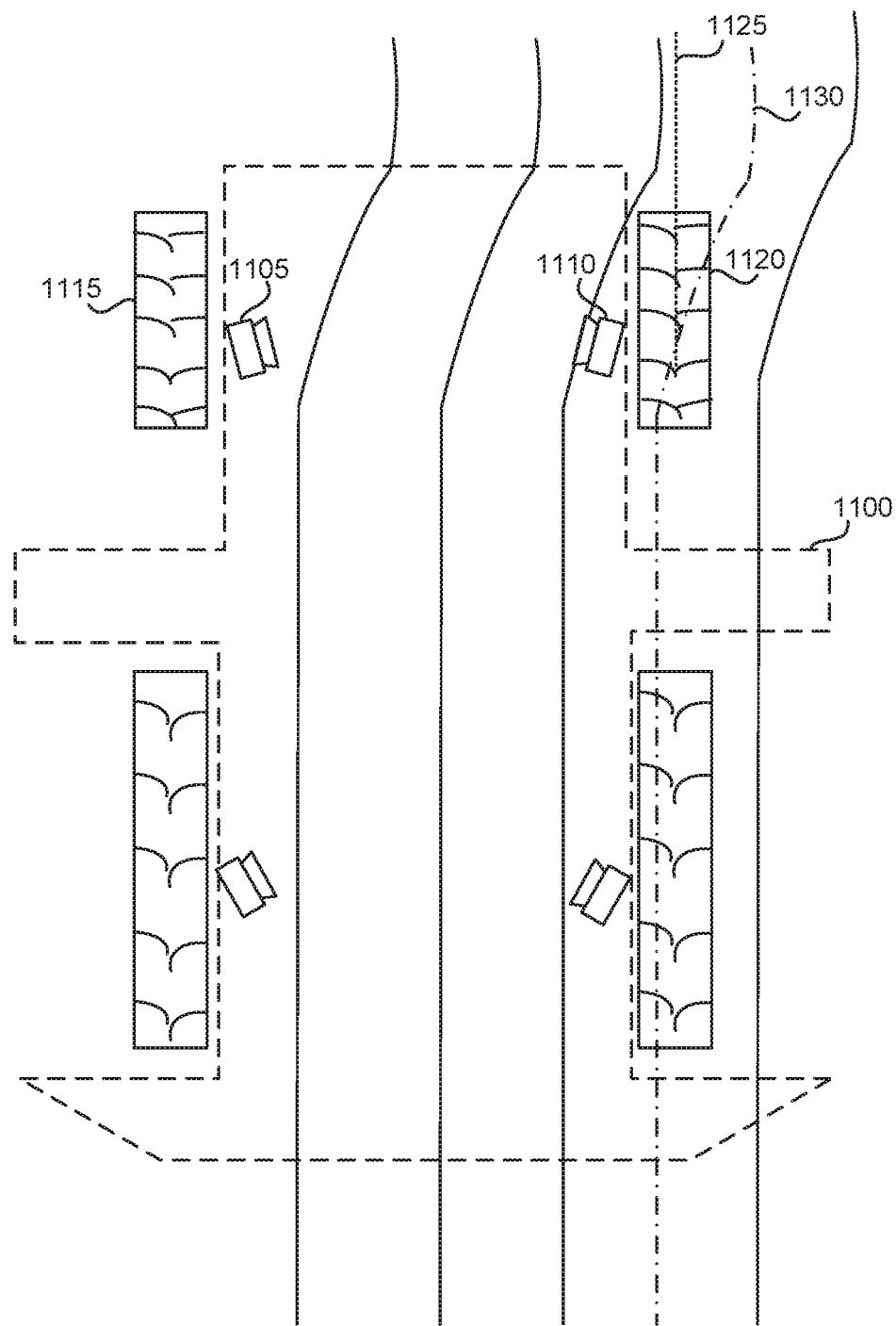
FIG. 11 is a diagram of an example of an agricultural vehicle during initial movement along curved crop rows.

FIG. 11 is a diagram of an example of an agricultural vehicle 1100 during initial movement along curved crop rows. The agricultural vehicle 1100 can include an example of any of the vehicles described herein. In an example, the agricultural vehicle 1100 is configured with one or more noncontact sensors 1105 and 1110 on opposing sides of the vehicle, such as on the wheels 1115 and 1120. As shown in FIG. 11, the wheel 1120 can traverse the field along a path 1125 which deviates from a target path 1130 (e.g., a center line between adjacent crop rows) as the vehicle 1100 encounters the curve in the crop rows. The noncontact sensors 1105 and 1110, however, are configured (e.g., oriented in a forward direction relative to the direction of travel of the vehicle 1100) to generate scan lines that look ahead of the agricultural vehicle 1100 to detect the curve before arrival of the ground engaging elements of the vehicle (e.g., the wheels 1115 and 1120). Accordingly, vehicle 1100 turning can be initiated upon arrival at the curve and before the agricultural vehicle begins to deviate from the target path 1130. This improves responsiveness of the agricultural vehicle 1100 as the vehicle reacts to turn in the correct direction (e.g., in a direction with the curve) before, or near immediately after, the initial encounter with the curve.

As a curve of increasing angle (e.g., a right-hand curve) approaches the agricultural vehicle 1100, the distance or deltas between the crop rows, as derived from scan line data generated by, for example, the noncontact sensor 1110, decrease even though the actual wheel angle relative the crop row immediately proximate the noncontact sensor has not yet changed. The apparent decrease in wheel angle based on the forward observed curving crop rows is used, such as by the comparative monitoring system 200, to indicate a change in vehicle heading (e.g., a change in wheel angle relative to a crop row). The change in vehicle heading can be used to proactively guide the agricultural vehicle 1100 along the curve of the crop rows as the vehicle traverses the curve.

Figure 12:
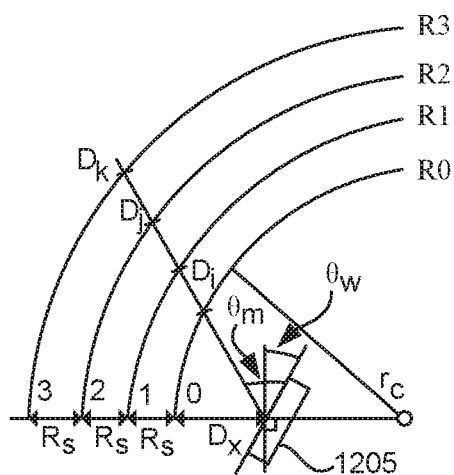
FIG. 12 is an example of a diagram that is useful in a technique for determining a vehicle position of an agricultural vehicle according to a scan line and a radius of curvature of curved crop rows.

FIG. 12 is an example of a diagram that is useful in a technique for determining a position of an agricultural vehicle according to a scan line and a radius of curvature K of curved crop rows. The technique is used to determine a position of the agricultural vehicle 1100 as it encounters or traverses a curve. More specifically, the technique is used to determine the distance $D_x$ of a vehicle element 1205 from the crop row R0 (e.g., the crop row closet to a noncontact sensor coupled to the vehicle element) and the angle $\theta_w$ of the vehicle element relative to the crop row R0. A noncontact sensor provides distance measurements $D_i$, $D_j$, and $D_k$ (e.g., distances to any set of three adjacent crop rows) from the sensor or vehicle element 1205 to rows R1, R2, and R3, respectively. In an example, the noncontact sensor 1110 in FIG. 11 is selected to provide the distance measurements based on its proximity to the inside of the curve. Such distance measurements are used, along with known or determined values of $R_s$ and $\theta_m$, to determine $D_x$ and $\theta_w$ according to equations (9), (10), and (11):

$$R_c = \frac{(R_s^2 - D_i^2)(D_j - D_k) + (R_s^2 j^2 - D_j^2)(D_k - D_i) + (R_s^2 k^2 - D_k^2)(D_i - D_j)}{2R_s[i(D_j - D_k) + j(D_k - D_i) + k(D_i - D_j)]} \quad (9)$$

$$D_x = R_c - \sqrt{D_i D_j + \frac{(R_c + iR_s)^2 D_j - (R_c + jR_s)^2 D_i}{D_j - D_i}} \ \% \ r_s \quad (10)$$

$$\theta_w = -90° + \theta_m + \cos^{-1}\left(\frac{(R_c - D_x)^2 + D_i^2 - (R_c + iR_s)^2}{2D_i(R_c - D_x)}\right) \quad (11)$$

where i, j, and k are crop row indexes.

In an example, equations (9), (10), and (11) are used to determine robust values $D_x$ and $\theta_w$ (e.g., values do not rely on potentially error inducing assumptions about the orientation of the agricultural vehicle chassis or straight crop rows) when statistically reliable scan line data for determining distances $D_i$, $D_j$, and $D_k$ can be obtained.

The radius of curvature $R_c$ can be continuously calculated, such as while an agricultural vehicle traverses a field, and compared to a threshold value to determine whether to use equations (9), (10), and (11) to determine the vehicle position (e.g., $D_x$ or $\theta_w$) of an agricultural vehicle.

Figure 13A:
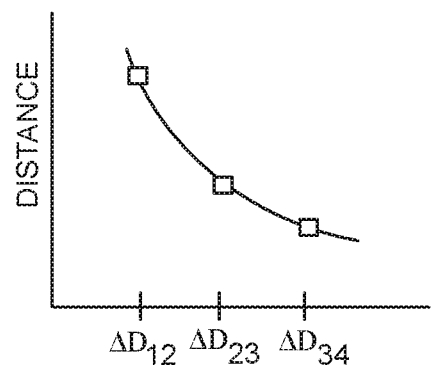
FIG. 13A is an example of a diagram that is useful for determining a direction of curvature of curved crop rows according to a scan line.
Figure 13B:
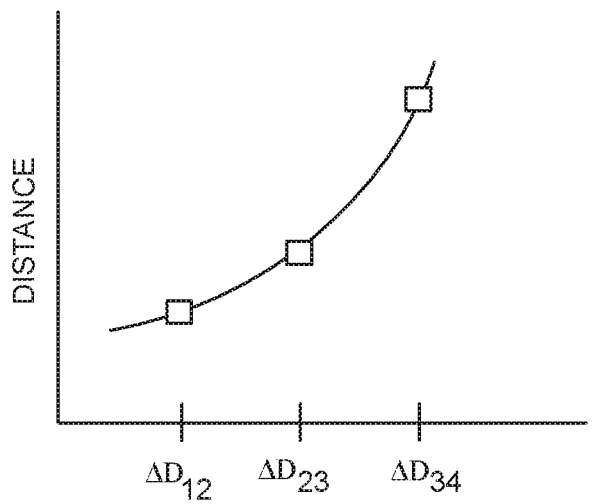
FIG. 13B is an example of a diagram that is useful for determining a direction of curvature of curved crop rows according to a scan line.

FIG. 13A and FIG. 13B each includes an example of a diagram that is useful for determining a direction of curvature of curved crop rows according to a scan line. As shown in the figures, the lengths of two or more segments of a scan line (e.g., the distances between adjacent crop rows) can be plotted against the relative position of the line segments along the scan line. The slope of the resulting curve is used to determine whether the scan line data is indicative of a left- or right-hand curve in the associated crop rows. Although the following assumes that scan line data is generated by a noncontact sensor that is proximate to the inside of a curve, the technique is equally applicable to data generated by sensors that are proximate to the outside of a curve. In an example, FIG. 13A is a plot of relative distances (e.g., along a scan line) between crop rows as determined from scan line data received from a noncontact sensor as an agricultural vehicle encounters a right-hand curve, such as the curve shown in FIG. 12. Similarly, FIG. 13B is a plot of relative distances between crop rows as determined from scan line data received from a noncontact sensor as an agricultural vehicle encounters a left-hand curve. The negative slope of the curve shown in FIG. 13A is indicative of the right-hand direction of curvature of the right-hand curve, while the positive slope of the curve shown in FIG. 13B is indicative of the left-hand direction of curvature of the left hand. Additionally, the magnitude of these slopes can be used to determine the severity (e.g., the degree of curvature) of the curves. The lengths of two or more segments of a scan line (e.g., row deltas) can also be used to determine when an agricultural vehicle is traveling along a straight path. More specifically, the change in row deltas, or the slop of plots of the row deltas, will be substantially constant when the vehicle is moving along a straight path.

Figure 14A:
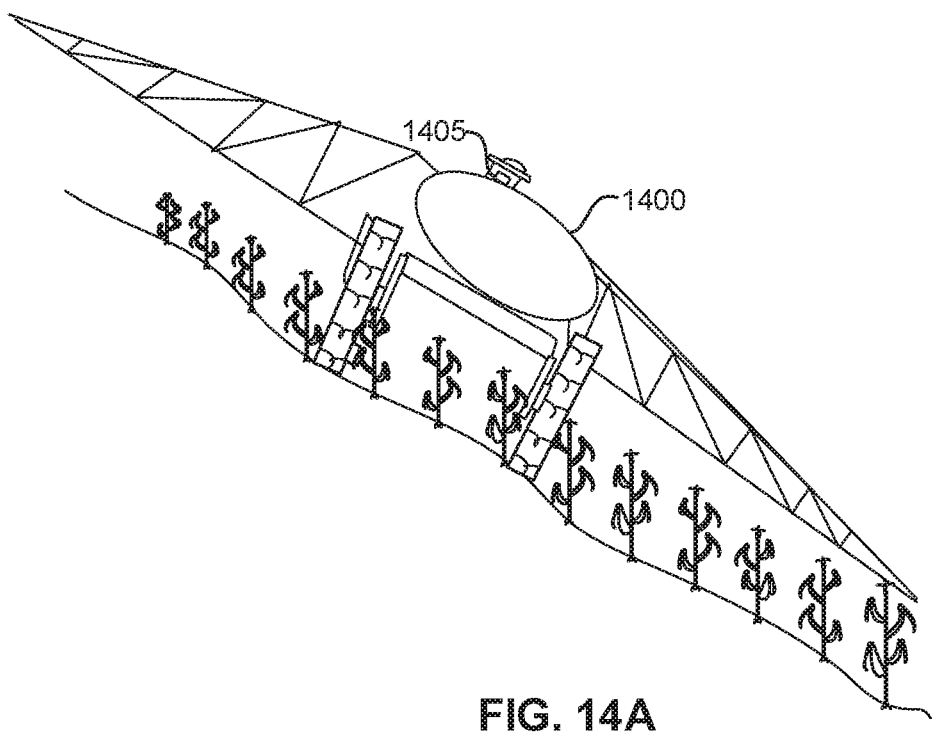
FIG. 14A is a diagram an agricultural vehicle on inclined ground having crop rows.
Figure 14B:
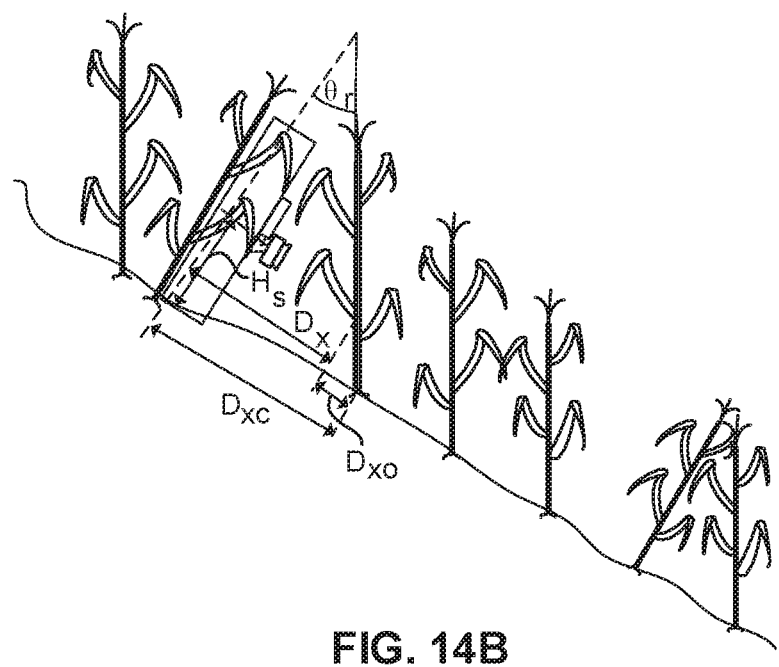
FIG. 14B is a diagram of an agricultural vehicle on inclined ground and in close proximity to adjacent crop rows.

FIG. 14A is a diagram of an agricultural vehicle 1400 on an inclined field having crop rows. The agricultural vehicle 1400 can include an example of any of the vehicles described herein, where such vehicle is equipped with an inertial sensor 1405 to detect or generate data that is indicative of the angular rotation (e.g., roll) of the vehicle relative to gravity. Because plants typically grow in the opposite direction to gravity, data generated by the inertial sensor 1405 can be used to determine the vehicle angle (e.g., wheel angle when observed from the front or rear of the vehicle 1400) between the vertical crop and the vehicle 1400. FIG. 14B shows that this vehicle angle $\theta_r$ (e.g., a roll angle) can be used, along with $D_x$ (e.g., lateral distance between the vehicle 1400, such as a wheel, and the crop row calculated from scan line data, as described herein) and a known noncontact sensor height $H_s$ relative to the ground, to determine a distance offset $D_{xo}$ (e.g., an uphill offset). The distance offset $D_{xo}$ can be used with, or added to, $D_x$ to determine a corrected wheel distance $D_{xo}$ (e.g., a distance from a crop row to the vehicle wheel) that compensates for the slope of the inclined field.

Figure 15:
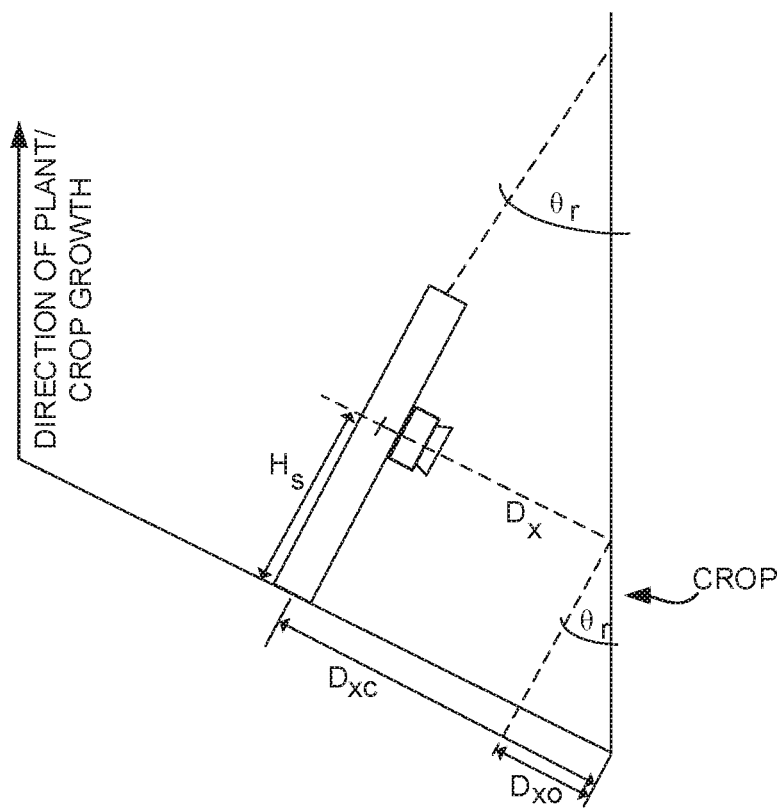
FIG. 15 is an example of a diagram that is useful in a technique for determining a position of an agricultural vehicle on inclined ground having crop rows.

FIG. 15 is an example of a diagram that is useful in a technique for determining a position of an agricultural vehicle on an inclined field having crop rows. As shown in FIG. 15, the distance $D_x$ is determined using scan line data and known values of $\theta_r$ according to the techniques described herein. The offset distance $D_{xo}$ is determined mathematically and added to $D_x$ to compensate for the slope of the field.

In operation, the roll angle detected by the inertial sensor 1405 can be used to control a vehicle wheel angle (e.g., yaw, or uphill or downhill wheel angle) relative to a crop or crop row. The vehicle wheel angle can be adjusted toward the uphill direction based on $D_{xo}$ (e.g., the slope compensated wheel distance from the crop), such as to achieve a specified wheel or vehicle spacing from the crop or crop row. The amount of adjustment to the vehicle wheel angle depends on one or more factors, such as machine weight, soil conditions, tire width, side hill angle, center of gravity of the machine. In some cases, the magnitude of the adjustment in the vehicle wheel angle includes one or more user entered gains or values learned or received as input while operating the vehicle.

Figure 16:
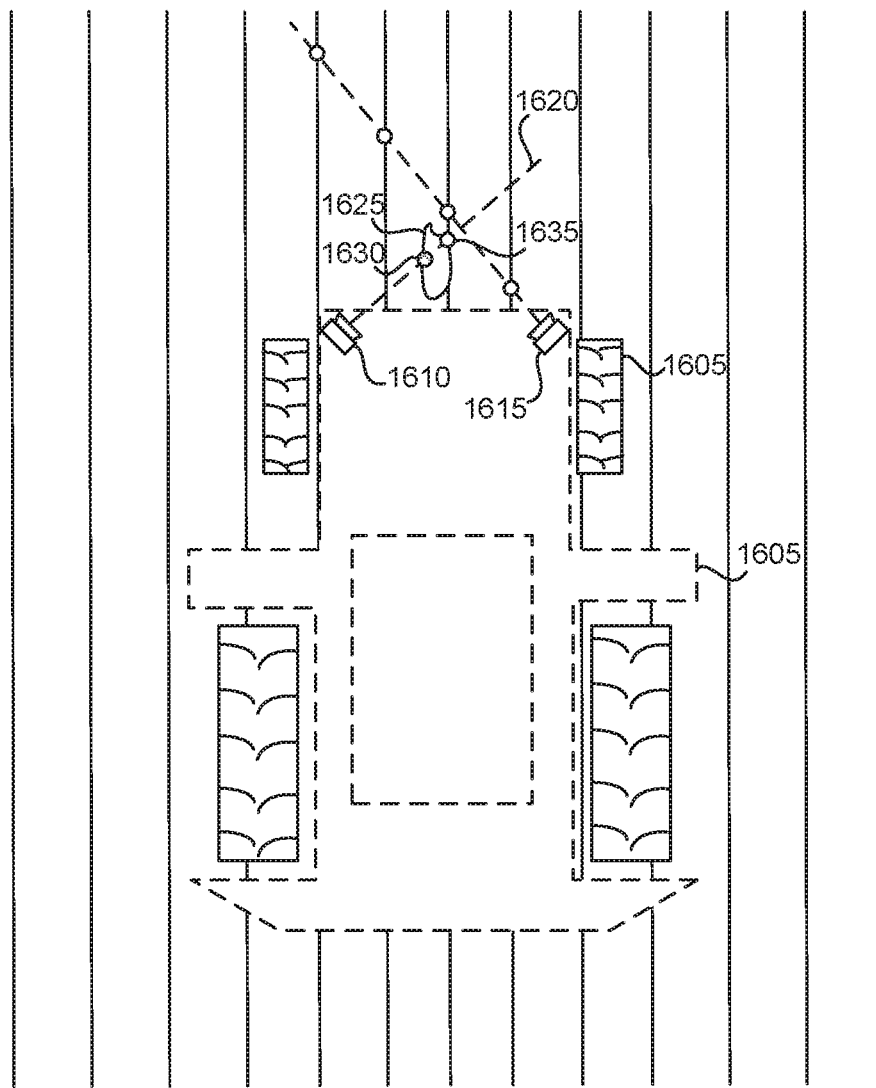
FIG. 16 is a diagram of an agricultural vehicle having noncontact sensors that are configured to provide guidance when a scan line is obstructed.

FIG. 16 is a diagram of an agricultural vehicle 1605 having two or more noncontact sensors 1610 and 1615 that are configured to provide guidance when a scan line, such as the scan line 1620, is obstructed. The noncontact sensors 1610 and 1615 can be configured (e.g., oriented and actuated) to generate scan line data that is indicative of distances to the same crop rows or other target. In an example, the sensors 1610 and 1615 are both configured in a forward oriented direction relative to the front of the vehicle 1605. In another example, the sensors 1610 and 1615 are both configured in a rearward oriented direction relative to the front of the vehicle. The configuration of the sensors 1610 and 1615 can enable missing data points (e.g., scan line distances that are incorrect, unreliable or not captured, such as due to an obstruction 1625) from a first sensor (e.g., sensor 1610) to be detected or replaced, such as by using corresponding data points generated by a second sensor (e.g., sensor 1615). In an example, a missing data point can be determined mathematically using scan line data from an unobstructed sensor, such as the noncontact sensor 1615. In an example, the obstruction 1625 causes the noncontact sensor 1610 to detect a high intensity signal (e.g., high energy or large amplitude signal) that incorrectly indicates a crop row measurement 1630. The high intensity signal can obscure the correct crop row measurement 1635. Using known data about the crop row spacing and scan line data from the noncontact sensor 1615, the weight of the high intensity signal can be adjusted to, for example, discount the use of such signal in row measurement or other distance calculations.

Figure 17:
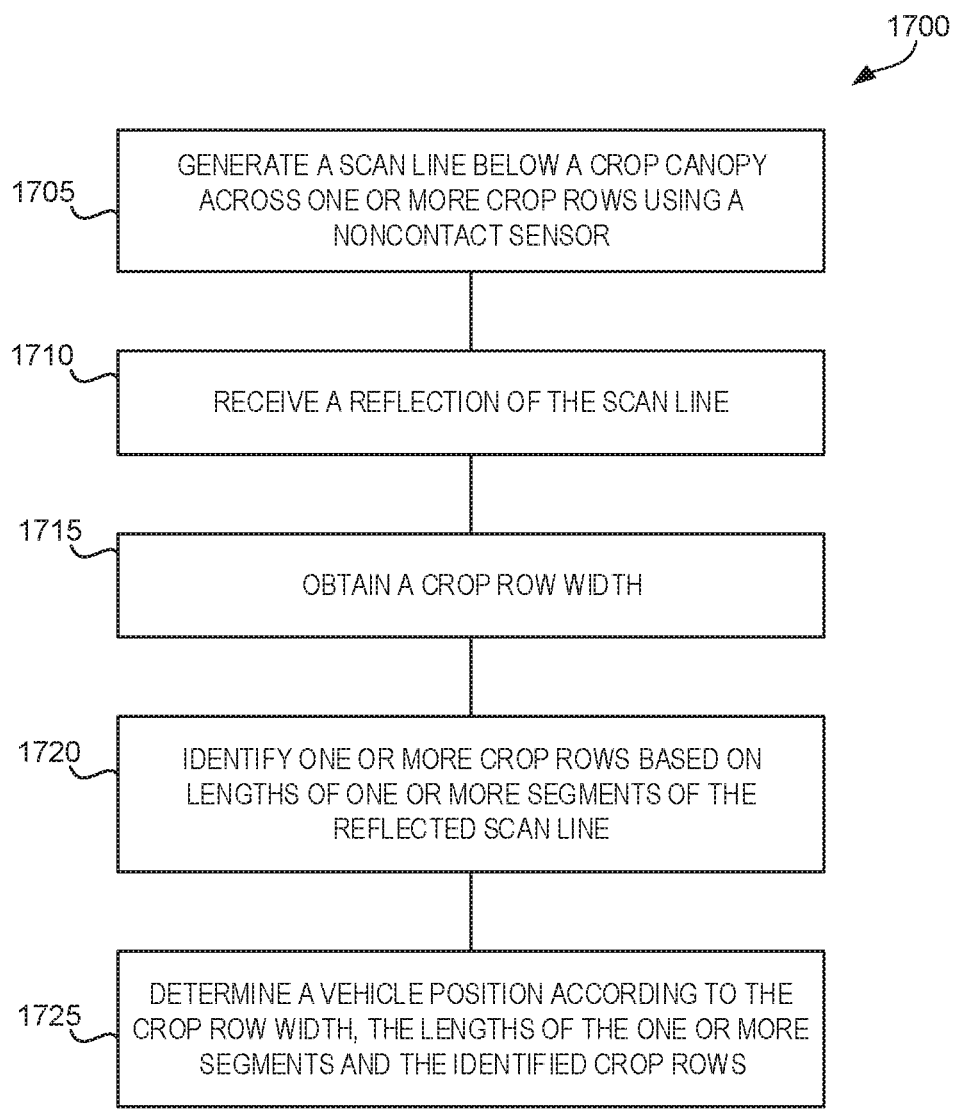
FIG. 17 is a diagram of a set of operations for monitoring an agricultural vehicle using a noncontact sensor.

FIG. 17 is a diagram of a set of operations 1700 for monitoring or controlling an agricultural vehicle using a noncontact sensor. The agricultural vehicle and the noncontact sensor can include examples of any of the agricultural vehicles and noncontact sensors described herein. The set of operations 1700 can be executed by one or more hardware circuits, such as the agricultural monitoring system 200 or the comparative vehicle monitor 1800.

At 1705, a scan line is generated using a noncontact sensor. In an example, the scan line is generated by transmitting a scan line signal from a sensor emanator across one or more crop rows of a field (e.g., causing the scan line signal to traverse one or more crop rows of the field). In a particular example, the scan line signal is transmitted in a direction that is orthogonal to the direction of growth of crops in one or more crop rows. In another example, the scan line signal is transmitted parallel to the field or ground. The scan line can be directed, or the noncontact sensor can be configured, according to any of the orientations described herein.

At 1710, a returned scan line signal (e.g., a reflection of at least a portion of the transmitted the scan line signal) is received, such by a detector circuit of the noncontact sensor. The returned signal includes a superposition of signals of having one or more phase, amplitude, frequency, or timing characteristic. In an example, a first part of the transmitted scan line signal is reflected from a first crop or crop row, such as a crop row closest the noncontact sensor, and therefore may have a first amplitude or timing characteristic. Additionally, a second part of the transmitted scan line signal can pass through the first crop row and be reflected by a second crop row, thereby causing the received signal to have a second amplitude or time characteristic.

At 1715, a crop row width is obtained. In an example, the crop row width is obtained from user input, such as through interface 205. In another example, the row width is determined during vehicle calibration. The calibration can include configuring (e.g., orienting) the noncontact sensor to generate scanlines perpendicular to one or more crop rows and estimating the crop row width from returned scan line data.

At 1720, one or more crop rows are identified using the returned scan line signal. In an example, a crop row is identified by processing the returned scan line signal to identify peaks in a time domain representation of the amplitude of the signal. The peaks can be compared to a threshold value to determine whether the peaks are associated with a crop row or whether the peaks are indicative of noise (e.g., reflections from weeds or non-crop stalk foliage). In some examples, the returned scan line signal is processed, such as by determining differences in the amplitude or time characteristics of the signal, to identify one or more scan line segments. In an example, such segments are determined based on distances or regions of a time based representation of the returned scan line data between amplitude peaks (e.g., adjacent peaks). The length of the segments are indicative of the distance between crop rows along the scan line. Such distance can be used to determine a crop row width or to filter (e.g., using a distance threshold) the scan line data.

At 1725, a vehicle position is determined using the scan line data. In an example the vehicle position includes a vehicle orientation, such as a vehicle wheel or chassis angle relative to a crop row. In another example, the vehicle position includes a vehicle location, such as a wheel or chassis location relative to a crop row. The vehicle position can be determined according to any of the previously described techniques using the provided crop row width, the scan line data (e.g., the lengths of the one or more scan line segments), or the identified crop rows.

In addition to the previously discussed operation, the set of operations 1700 can include any other operation that is useful for implementing the techniques described herein.

Figure 18:
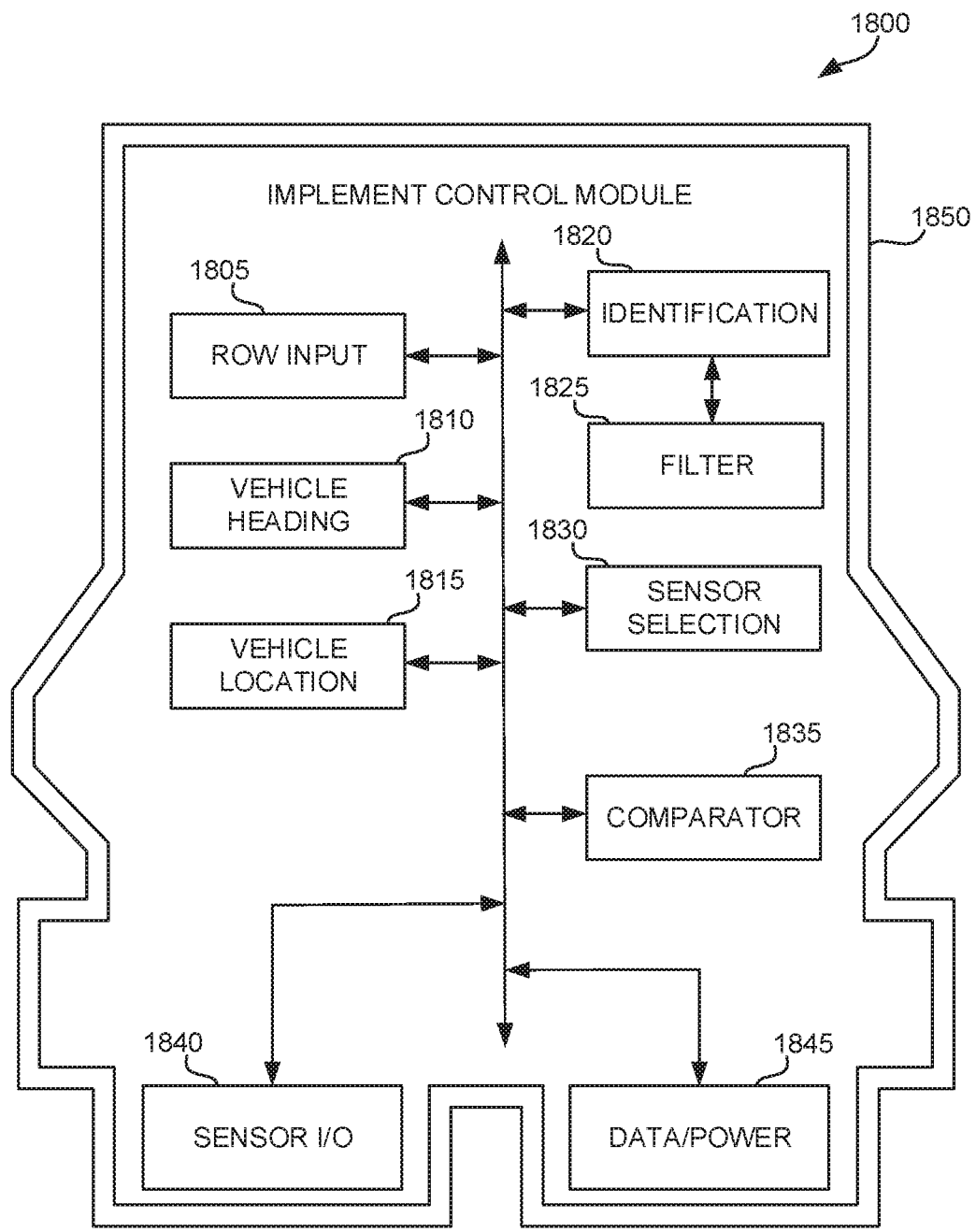
FIG. 18 is a diagram of a comparative vehicle monitor.

FIG. 18 is a diagram of an example of a comparative vehicle monitor 1800, such as the comparative vehicle monitor 210 (FIG. 2). The comparative vehicle monitor 1800 includes circuitry, computer readable media, or software modules that are configured to execute the techniques described herein. In an example, the comparative vehicle monitor 1800 receives scan line data from a noncontact sensor (e.g., by transmitting control information to, and receiving scan line data from, the sensor over the sensor input/output port 1840). The noncontact sensor can include any of the noncontact sensors described herein, such as a radar sensor mounted near a steering axle (e.g., the front axle of an agricultural vehicle). The received scan line data is indicative of distances to one or more objects (e.g., crops or crop rows) along the scan line. In an example, the scan line data includes timing and energy (e.g., signal intensity or amplitude) information that is reflected from objects along the scan line. The comparative vehicle monitor 1800 processes the scan line data to detect the positions of one or more of objects (e.g., crop rows) and to use the detected positions of the objects to determine the vehicle position of the agricultural vehicle relative to the crop rows. In an example, the detected vehicle position is used to adjust guidance of the agricultural vehicle. In a particular example, the comparative vehicle monitor 1800 provides steering cues or commands to an automated driving control system to guide the agricultural vehicle toward the center of a row gap between crop rows.

Components of the comparative vehicle monitor 1800 communicate, such to exchange data, control signals, or other information, using an any appropriate communication fabric or communication channel. In an example one or more components of the comparative vehicle monitor 1800 are integrated in a processing circuit, such as a microcontroller, an application specific integrated circuit, a programmable gate array, or other similar device. In another example, one or more components of the comparative vehicle monitor 1800 are enclosed in the control housing 1850.

The row input module 1805 includes one or more circuits or software modules for determining one or more crop row characteristics. Examples of the crop row characteristics include a crop row width or a target vehicle position (e.g., a wheel location between two crop rows). In an example, the row input module 1805 receives the row characteristics from an operator, such as through the interface 205. In another example, the row input module 1805 determines the row characteristics through execution of a calibration operation or other techniques using one or more sensors, such as a noncontact sensor.

The vehicle heading module 1810 includes one or more circuits or software modules for determining the heading of an agricultural vehicle. In an example, the vehicle heading includes the angle of the vehicle chassis, the vehicle wheel angle, or the orientation of a noncontact sensor or a scan line. The vehicle heading module 1810 receives vehicle and sensor information, such as a specified row characteristic (e.g., a row width), a sensor mounting angle and height, a vehicle roll angle, or other information regarding the configuration of the vehicle or attached sensors. The vehicle heading module 1810 uses the vehicle and sensor information, along with scan line data (e.g., crop row distances or scan line segment lengths, such as determined by identification module 1820), to determine a vehicle heading using one or more of the techniques described herein.

The vehicle location module 1815 includes one or more circuits or software modules for determining the location of an agricultural vehicle. The location, in an example, includes an absolute location of the vehicle in a field or other environment. The location, in another example, includes a location of the vehicle relative to one or more crops or crop rows, as described herein. In an example, the vehicle location includes the location of the vehicle chassis, a vehicle wheel, or a sensor. The vehicle location is determined, in an example, based on the vehicle heading or the lengths of one or more scan line segments using to one or more of the techniques described herein.

The identification module 1820 includes one or more circuits or software modules for identifying crops or crop rows in a field. In an example, the identification module 1820 identifies crops or crop rows using received scan line data and one or more row or crop thresholds. The thresholds, in an example, include a static threshold based on a crop characteristic, such as crop stalk width or crop row width. The thresholds, in another example, include a dynamic threshold, such as a threshold determined from scan line data. In an example, a dynamic threshold is determined based on inflection points between peaks in the time based representations of the amplitude of signal energy of returned scan line signals. The inflection points can be indicative of an interface between crop rows, or between a crop row and a row gap. In another example, a dynamic threshold is determined based on analysis of signal amplitudes (e.g., the largest amplitudes) across a window of time or series of measurements.

In an example, the identification module 1820 determines the lengths of one or more scan line segments (e.g., the distance or deltas between detected objects or features), such as by determining the time of flight of components of a returned scan line signal, or the distance from a noncontact sensor to one or more detected objects, such as a crop, a crop row, or a vehicle wheel.

The filter module 1825 includes one or more circuits or software modules to filter or refine, such as by using a static or dynamic threshold, the identification of features or objects from scan line data. The filter module 1825, in an example, uses the thresholds to discard scan line data derived from signals that are either too weak or too strong to be indicative of valid crop or row measurements.

In an example, two or more noncontact sensors are used at the same time to enhance the filtering of scan line data or to enhance the confidence of measurements or values (e.g., vehicle angle and vehicle location relative to crops) derived or determined from scan line data, as described herein. Input from two or more noncontact sensors (e.g., visual sensors or the like) can be used for comparison derived measurements or other values and to correlate such measurements or values with other measurements or values.

In an example, data generated by a GPS sensor is used with scan line data generated by the noncontact sensors described herein to improve the discussed filtering or measurement determinations.

In another example, a camera (e.g., a video camera, still or the like) is used with smaller crops to determine clear separations between rows. Such camera, depending on the angle, can have a longer field of view compared to other noncontact sensors and potentially observers. In some applications, such cameras also see further than radar or LIDAR noncontact sensors. In an example, the sensed or determined characteristics derived from sensor input from the camera and radar/LIDAR noncontact sensors are compared and used to filter measurement values. In an example, when a vehicle encounters a curve, the curvature of the curve determined by each type of sensor is compared to find an average or filtered curvature for the vehicle move toward.

In another example, a visual sensor (e.g., a camera) is used as another sensor (e.g., GPS sensor), in addition to a radar/LIDAR noncontact sensor, for determining the distance of the vehicle (e.g., a wheel) from a crop row. The sensed characteristics from such sensors are processed to generate a filter and accordingly determine a filtered distance from an agricultural vehicle to a crop row. Optionally, this filter is assigned differing gains and the gains are adjusted depending on conditions. For example, if the camera detects weeds above specified thresholds (x number of weeds per square meter or the like) the gain associated with the radar/LIDAR signals is decreased (affecting each of $D_x$, wheel angle relative to row, measured curvature, relative curvature, or the like). In a converse situation if the crop is "canopied" the visual noncontact sensors have difficulty assessing or identifying rows and the sensor input from the visual sensors is accordingly assigned a smaller gain to minimize the impact of the visual sensing. Conversely, in such situations, the gain to the radar/LIDAR noncontact sensors is increased.

Sensor selection module 1830 includes one or more circuits or software modules to select one or more sensors, or scan line data generated by one or more sensors, to use for position determination or vehicle guidance. Such selection can be determined based on the position of the sensors relative a crop row, sensor deadbands, the reliability of scan line data received from a sensor, or the position of a sensor relative to the curvature of a crop row. In an example, a sensor, or scan line data generated by the sensor, is selected based on how closely a row width calculated from the scan line data of generated by the sensor matches a specified or known row width. In another example, a first sensor is selected based on the sensor deadband of a second sensor, or based on the measurements (e.g., vehicle location, row width, etc.) derived from such sensor.

In an example, the sensor selection module 1830 combines, or fuses, scan line data generated by two opposing noncontact sensors, such as the noncontact sensors 1610 and 1615 shown in FIG. 16, to determine a location error or offset $D_x$ from a crop based on scan line data of both sensors. In a specific example, scan line data from a noncontact sensor on the left wheel of an agricultural vehicle is linearly combined with sensor data generated by a right wheel according to equations (12), (13), and (14):

$$Err_L = \left(\frac{1}{2}(D_w \% R_s) - D_{xL}\right)\% R_s \quad (12)$$

$$Err_R = \left(\frac{1}{2}(D_w \% R_s) - D_{xR}\right)\% R_s \quad (13)$$

$$Err_C = gain_L \cdot Err_L + gain_R \cdot Err_R \quad (14)$$

where $D_w$ is a wheel-base width of the agricultural vehicle of the agricultural vehicle (e.g., the distance between opposing wheels proximate to the left and right noncontact sensors), $R_s$ is a known or determined row spacing, $D_{xR}$ and $D_{xL}$ are the wheel (or sensor) to adjacent crop row distances ($D_x$) determined for the left and right sensors, respectively, as described herein. The term $gain_R$ and $gain_L$ are weights that are determined based on a confidence (e.g., a statistical confidence or any other sensor selection weighting technique) in scan line data provided by the left and right sensors, respectively.

The comparator 1835 includes one or more circuits or software modules to identify or determine a vehicle deviation from a target path or position (e.g., orientation or location). The vehicle deviation, in an example, is determined based on a difference between a target (e.g., specified) vehicle path or position value and a determined (e.g., calculated) path or position value. In an example, the comparator 1835 determines the difference between a determined distance from a vehicle to a crop row (e.g., a $D_x$ value) and a specified vehicle to crop row distance value (e.g., a target location, such as the middle of a row gap). The determined difference or deviation can be provided to an automated steering system, such as the steering interface 215, in one or more cues or active steering guidance.

The data/power port 1845 includes one or more circuits or interfaces to power the comparative vehicle monitor 1800 and to exchange data or other information between the comparative vehicle monitor and one or more other systems or device associated with a vehicle.

The sensor input/output port 1840 includes one or more circuits to exchange data, control signals, or other information between the comparative vehicle monitor 1800 and one or more vehicle sensors, such as the noncontact sensors described herein.

VARIOUS NOTES & EXAMPLES

Example 1 is an agricultural vehicle monitoring system comprising: one or more noncontact sensors configured for coupling with an agricultural vehicle, the one or more noncontact sensors are configured to sense multiple objects along a scan line, the one or more noncontact sensors each include: a scan line generator configured to generate the scan line, wherein the scan line generator is oriented to generate the scan line transverse to one or more crop rows; and a scan line receiver configured to receive a reflection of the scan line; and a comparative vehicle monitor in communication with the one or more noncontact sensors, the comparative vehicle monitor configured to: provide a specified row width; and determine a vehicle position of the agricultural vehicle relative to the one or more crop rows according to the specified row width, a mounting angle of the one or more noncontact sensors, and a length of a scan line segment of the scan line between the scan line generator and one or more of the crop rows.

In Example 2, the subject matter of Example 1 includes, wherein the vehicle position comprises at least one of a vehicle angle or a vehicle location relative to the one or more crop rows.

In Example 3, the subject matter of Example 2 includes, wherein: the scan line generator includes a forward oriented scan line generator and a rearward oriented scan line generator, and the comparative vehicle monitor is further configured to determine the vehicle angle of the agricultural vehicle according to a first scan line length of a first scan line that extends from the forward oriented scan line generator to the one or more crop rows and a second scan line length that extends from the rearward oriented scan line generator to the one or more crop rows.

In Example 4, the subject matter of Examples 1-3 includes, wherein the scan line generator is oriented to generate the scan line perpendicularly relative to at least one stalk of an agricultural crop.

In Example 5, the subject matter of Examples 1-4 includes, wherein the scan line generator is oriented to generate the scan line parallel to the ground.

In Example 6, the subject matter of Examples 1-5 includes, wherein the scan line generator is oriented to generate the scan line in a direction preceding the agricultural vehicle.

In Example 7, the subject matter of Examples 1-6 includes, wherein the scan line generator is oriented to generate the scan line in a direction aft of the agricultural vehicle.

In Example 8, the subject matter of Examples 1-7 includes, wherein the comparative vehicle monitor includes a steering interface configured to couple with one or more of an output device or an automated steering system.

In Example 9, the subject matter of Examples 1-8 includes, the agricultural vehicle having one or more wheel assemblies coupled with a vehicle chassis; and the one or more noncontact sensors are coupled with the one or more wheel assemblies.

In Example 10, the subject matter of Examples 1-9 includes, the agricultural vehicle having a front ground engaging element and rear ground engaging element; and at least one noncontact sensor of the one or more noncontact sensors is coupled to the rear ground engaging element.

In Example 11, the subject matter of Example 10 includes, wherein the rear ground engaging element is a rear wheel assembly.

In Example 12, the subject matter of Examples 10-11 includes, the comparative vehicle monitor in communication with the at least one noncontact sensor, the comparative vehicle monitor configured to: determine a vehicle angle or a vehicle location of the agricultural vehicle relative to the one or more crop rows according to the specified row width, a mounting angle of the at least one noncontact sensor on the rear ground engagement element.

In Example 13, the subject matter of Example 1-12 includes, the agricultural vehicle having first and second wheels; and the one or more noncontact sensors include at least first and second noncontact sensors, wherein: the first noncontact sensor is coupled proximate the first wheel and the scan line generator of the first noncontact sensor is directed toward the second wheel; and the second noncontact sensor is coupled proximate the second wheel and the scan line generator of the second noncontact sensor is directed toward the first wheel.

In Example 14, the subject matter of Examples 1-13 includes, the first and second wheels coupled to the agricultural vehicle at a rear or aft portion of a vehicle chassis of the agricultural vehicle relative to third and fourth wheels coupled to the agricultural vehicle at a front or forward position of the vehicle chassis of the agricultural vehicle.

In Example 15, the subject matter of Example 14 includes, wherein the comparative vehicle monitor is further configured to select the scan line for the second noncontact sensor if a vehicle location determined with the first noncontact sensor is proximate to the specified row width.

In Example 16, the subject matter of Examples 14-15 includes, wherein the comparative vehicle monitor is further configured to select the scan line for the second noncontact sensor if a vehicle location determined with the first noncontact sensor is proximate to the specified row width including the specified row width and a sensor deadband for the first noncontact sensor.

In Example 17, the subject matter of Examples 14-16 includes, wherein the comparative vehicle monitor is further configured to: select the scan line for both the second noncontact sensor and the first noncontact sensor; and determine a vehicle angle of the agricultural vehicle according to a confidence value for the first noncontact sensor and a confidence value for the second noncontact sensor.

In Example 18, the subject matter of Examples 1-17 includes, the agricultural vehicle having a vehicle chassis; and the one or more noncontact sensors are coupled with the vehicle chassis.

In Example 19, the subject matter of Examples 14-18 includes, wherein the vehicle chassis includes one or more of a vehicle frame or an agricultural implement.

In Example 20, the subject matter of Examples 1-19 includes, wherein the comparative vehicle monitor is further configured to identify the one or more crop rows from the scan line.

In Example 21, the subject matter of Example 20 includes; wherein the comparative vehicle monitor is configured to identify the one or more crop rows from the scan line with a row threshold.

In Example 22, the subject matter of Examples 20-21 includes, wherein the comparative vehicle monitor is further configured to filter noise artifacts from the identified one or more crop rows based on an identification of the first crop row and the specified row width.

In Example 23, the subject matter of Examples 20-22 includes, wherein the comparative vehicle monitor is further configured to filter noise artifacts from the identified one or more crop rows based on an identification of at least the first crop row.

In Example 24, the subject matter of Examples 1-23 includes, wherein the determined vehicle location corresponds to a distance of the one or more sensors from the first crop row.

In Example 25, the subject matter of Examples 1-24 includes, wherein the determined vehicle location corresponds to a distance from a first or second crop row to an opposed vehicle feature detected along the scan line.

In Example 26, the subject matter of Examples 1-25 includes, wherein the one or more noncontact sensors include one or more of a radar sensor, LIDAR sensor, or ultrasound sensor.

Example 27 is an agricultural vehicle monitoring system comprising: one or more noncontact sensors configured for coupling with an agricultural vehicle, the one or more noncontact sensors are configured to sense multiple objects along a scan line, the one or more noncontact sensors each include: a scan line generator configured to generate the scan line; and a scan line receiver configured to receive a reflection of the scan line; wherein the scan line generator is oriented to generate the scan line orthogonally relative to a plurality of crop rows including at least first and second crop rows; and a comparative vehicle monitor in communication with the one or more noncontact sensors, the comparative vehicle monitor includes: a row input module configured to provide a specified row width; an identification module configured to identify the plurality of crop rows from the scan line and determine one or more lengths of scan line segments between identified crop rows; and a vehicle position module configured to determine a vehicle position including one or more of a vehicle angle or a vehicle location according to the specified row width and the one or more determined lengths of scan line segments between identified crop rows.

In Example 28, the subject matter of Example 27 includes, wherein the vehicle position module includes: a vehicle heading module configured to determine the vehicle angle; and a vehicle location module configured to determine the vehicle location relative to one or more crop rows.

In Example 29, the subject matter of Examples 27-28 includes, wherein the comparative vehicle monitor includes a comparator configured to determine a position difference between the determined vehicle position and a target vehicle position.

In Example 30, the subject matter of Example 29 includes, wherein the comparative vehicle monitor includes a steering interface configured for coupling with one or more of an output device or an automated steering system, and the comparator is in communication with the steering interface.

In Example 31, the subject matter of Example 30 includes, the agricultural vehicle having first and second wheels; wherein the one or more noncontact sensors include at least first and second noncontact sensors, the first noncontact sensor is coupled proximate the first wheel and the scan line generator of the first noncontact sensor is directed toward the second wheel; and the second noncontact sensor is coupled proximate the second wheel and the scan line generator of the second noncontact sensor is directed toward the first wheel.

In Example 32, the subject matter of Example 31 includes, the first and second wheels coupled to the agricultural vehicle at a rear or aft portion of a vehicle chassis of the agricultural vehicle relative to third and fourth wheels coupled to the agricultural vehicle at a front or forward position of the vehicle chassis of the agricultural vehicle.

In Example 33, the subject matter of Examples 31-32 includes, wherein the comparative vehicle monitor includes a sensor selection module, and the sensor selection module is configured to select the scan line for the second noncontact sensor if the vehicle location determined with the first noncontact sensor is proximate to the specified row width.

In Example 34, the subject matter of Examples 31-33 includes, wherein the comparative vehicle monitor includes a sensor selection module, and the sensor selection module is configured to select the scan line for the second noncontact sensor if the vehicle location determined with the first noncontact sensor is proximate to the specified row width including the specified row with and a sensor deadband for the first noncontact sensor.

In Example 35, the subject matter of Examples 27-34 includes, wherein the scan line generator is oriented to generate the scan line perpendicularly relative to stalks of an agricultural crop.

In Example 36, the subject matter of Examples 27-35 includes, wherein the scan line generator is oriented to generate the scan line parallel to the ground.

In Example 37, the subject matter of Examples 27-36 includes, wherein the scan line generator is oriented to generate the scan line in a direction preceding the agricultural vehicle.

In Example 38, the subject matter of Examples 27-37 includes, wherein the scan line generator is oriented to generate the scan line in a direction following the agricultural vehicle.

In Example 39, the subject matter of Examples 27-38 includes, wherein the identification module is configured to identify the plurality of crop rows from the scan line with a row threshold.

In Example 40 the subject matter of Examples 27-39 includes, wherein the comparative vehicle monitor includes a filter configured to filter noise artifacts from the identified plurality of crop rows based on an identification of a first crop row and the specified row width.

In Example 41, the subject matter of Examples 27-40 includes, wherein the comparative vehicle monitor includes a filter configured to filter noise artifacts from the identified plurality of crop rows based on an identification of at least the first crop row.

In Example 42, the subject matter of Examples 27-41 includes, wherein the determined vehicle position corresponds to a distance of the one or more noncontact sensors from a first crop row.

In Example 43, the subject matter of Examples 27-42 includes, wherein the determined vehicle position corresponds to a distance from the first row to an opposed vehicle feature detected along the scan line.

Example 44 is a method for monitoring an agricultural vehicle using a noncontact sensor, the method comprising: generating, using the noncontact sensor, a scan line orthogonally relative to two or more crop rows; receiving a reflection of the scan line from a first crop row of the two or more crop rows; obtaining a crop row width; identifying one or more crop rows based on one or more lengths of scan line segments from the reflection of the scan line; and determining a vehicle position of the agricultural vehicle according to the crop row width and the one or more determined lengths of scan line segments.

In Example 45, the subject matter of Example 44 includes; wherein determining the vehicle position comprises determining one or more of a vehicle angle or a vehicle location relative to a crop row of the two or more crop rows.

In Example 46, the subject matter of Example 45-46 includes, determining the vehicle angle by determining a wheel angle of a wheel of the agricultural vehicle according to the vehicle location and a mounting angle of the noncontact sensor.

In Example 47, the subject matter of Examples 45-46 includes, determining the vehicle location according to a mounting angle of the noncontact sensor and a length of a scan line segment from the noncontact sensor to a first crop row of the one or more crop rows.

In Example 48 the subject matter of Examples 45-47 includes, wherein the noncontact sensor comprises a forward directed noncontact sensor and an aft directed noncontact sensor, and the method further comprises determining the vehicle angle or the vehicle location according to: a length of a first scan line segment from the forward directed noncontact sensor to a first crop row of the one or more crop rows; and a length of a second scan line segment from the aft directed noncontact sensor to the first crop row.

In Example 49, the subject matter of Examples 45-48 includes, coupling the noncontact sensor to a rear wheel assembly of the agricultural vehicle and determining the vehicle angle or vehicle position based on an angle or a position of the rear wheel assembly relative to the first crop row.

In Example 50, the subject matter of Examples 44-49 includes, determining the vehicle position according to: a length of a scan line segment from the noncontact sensor to a first crop row of the one or crop rows; and a length of a scan line segment from the noncontact sensor to a second crop row of the one or crop rows.

In Example 51, the subject matter of Examples 44-50 includes, wherein: the noncontact sensor comprises a first noncontact sensor coupled proximate to a first wheel of the agricultural vehicle and a second noncontact sensor coupled proximate to a second wheel of the agricultural vehicle, and determining the vehicle position of the agricultural vehicle comprises determining a vehicle offset from a specified location between the first noncontact sensor and the second noncontact sensor.

In Example 52, the subject matter of Examples 44-51 includes, identifying the two or more crop rows from the reflected scan line using a row threshold.

In Example 53, the subject matter of Examples 44-52 includes, filtering noise artifacts from the identified two or more crop rows based on the crop row width.

In Example 54, the subject matter of Examples 44-53 includes, wherein each of the one or more lengths of scan line segments corresponds to a distance between two crop rows of the two or more crop rows or a distance between the noncontact sensor and a crop row of the two or more crop rows.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. An agricultural vehicle monitoring system comprising:
   one or more noncontact sensors configured for coupling with an agricultural vehicle, the one or more noncontact sensors are configured to sense one or more objects along a scan line, the one or more noncontact sensors each include:
   a scan line generator configured to generate the scan line, wherein the scan line generator is oriented to generate the scan line transverse to one or more crop rows; and
   a scan line receiver configured to receive a reflection of the scan; and
   a comparative vehicle monitor in communication with the one or more noncontact sensors, the comparative vehicle monitor configured to:
   receive a specified row width;
   detect one or more amplitude peaks in the reflection of the scan line;
   determine a length of a scan line segment of the scan line based on the detected one or more amplitude peaks; and
   determine a vehicle position of the agricultural vehicle relative to the one or more crop rows based on the specified row width, a mounting angle of the one or more noncontact sensors, and the determined length of the scan line segment.

2. The agricultural vehicle monitoring system of claim 1, wherein the vehicle position comprises at least one of a vehicle angle or a vehicle location relative to the one or more crop rows.

3. The agricultural vehicle monitoring system of claim 2, wherein:
   the scan line generator includes a forward oriented scan line generator and a rearward oriented scan line generator, and
   the comparative vehicle monitor is further configured to determine the vehicle angle of the agricultural vehicle according to a length of a scan line segment of a first scan line that extends from the forward oriented scan line generator to the one or more crop rows and a length of a line segment of a second scan line that extends from the rearward oriented scan line generator to the one or more crop rows, wherein the length of the scan line segment of the scan line between the scan line generator and one or more of the crop rows includes the length of the scan line segment of a first scan line and length of a scan line segment of a second scan line.

4. The agricultural vehicle monitoring system of claim 1, wherein the scan line generator is oriented to generate the scan line perpendicularly relative to at least one stalk of an agricultural crop.

5. The agricultural vehicle monitoring system of claim 1, wherein the scan line generator is oriented to generate the scan line parallel to the ground.

6. The agricultural vehicle monitoring system of claim 1, wherein the scan line generator is oriented to generate the scan line in a direction preceding the agricultural vehicle.

7. The agricultural vehicle monitoring system of claim 1, wherein the scan line generator is oriented to generate the scan line in a direction of the agricultural vehicle.

8. The agricultural vehicle monitoring system of claim 1, wherein the comparative vehicle monitor includes a steering interface configured to couple with one or more of an output device or an automated steering system.

9. The agricultural vehicle monitoring system of claim 1, further comprising:
   the agricultural vehicle having one or more wheel assemblies coupled with a vehicle chassis; and
   the one or more noncontact sensors coupled with the one or more wheel assemblies.

10. The agricultural vehicle monitoring system of claim 1, wherein the agricultural vehicle includes front and rear ground engaging elements, and wherein:

at least one noncontact sensor of the one or more noncontact sensors is coupled proximate the rear ground engaging element.

11. The agricultural vehicle monitoring system of claim 10, wherein the rear ground engaging element is a rear wheel assembly.

12. The agricultural vehicle monitoring system of claim 10, further comprising the comparative vehicle monitor in communication with the at least one noncontact sensor, the comparative vehicle monitor configured to:
determine a vehicle angle or a vehicle location of the agricultural vehicle relative to the one or more crop rows according to the specified row width and a mounting angle of the at least one noncontact sensor relative to the rear ground engagement element.

13. The agricultural vehicle monitoring system of claim 1, wherein the agricultural vehicle includes first and second wheels, and wherein:
the one or more noncontact sensors include at least first and second noncontact sensors:
the first noncontact sensor is configured for coupling proximate the first wheel and the scan line generator of the first noncontact sensor is directed toward the second wheel; and
the second noncontact sensor is configured for coupling proximate the second wheel and the scan line generator of the second noncontact sensor is directed toward the first wheel.

14. The agricultural vehicle monitoring system of claim 1, further comprising the first and second wheels coupled to a rear portion of a vehicle chassis of the agricultural vehicle relative to third and fourth wheels coupled to a front position of the vehicle chassis of the agricultural vehicle.

15. The agricultural vehicle monitoring system of claim 14, wherein the comparative vehicle monitor is further configured to select the scan line for the second noncontact sensor if a vehicle location determined with the first noncontact sensor is proximate to the specified row width.

16. The agricultural vehicle monitoring system of claim 14, wherein the comparative vehicle monitor is further configured to select the scan line for the second noncontact sensor if a vehicle location determined with the first noncontact sensor is proximate to the specified row width including the specified row width and a sensor deadband for the first noncontact sensor.

17. The agricultural vehicle monitoring system of claim 14, wherein the comparative vehicle monitor is further configured to:
select the scan line for both the second noncontact sensor and the first noncontact sensor; and
determine a vehicle angle of the agricultural vehicle according to a confidence value for the first noncontact sensor and a confidence value for the second noncontact sensor.

18. The agricultural vehicle monitoring system of claim 14, wherein the vehicle chassis includes one or more of a vehicle frame or an agricultural implement.

19. The agricultural vehicle monitoring system of claim 1, wherein the agricultural vehicle includes a vehicle chassis, and the one or more noncontact sensors are configured to couple proximate the vehicle chassis.

20. The agricultural vehicle monitoring system of claim 1, wherein the comparative vehicle monitor is further configured to identify the one or more crop rows from the scan line.

21. The agricultural vehicle monitoring system of claim 20, wherein the comparative vehicle monitor is configured to identify the one or more crop rows from the scan line with a row threshold.

22. The agricultural vehicle monitoring system of claim 20, wherein the comparative vehicle monitor is further configured to filter noise artifacts from the identified one or more crop rows based on an identification of the first crop row and the specified row width.

23. The agricultural vehicle monitoring system of claim 20, wherein the comparative vehicle monitor is further configured to filter noise artifacts from the identified one or more crop rows based on an identification of at least the first crop row.

24. The agricultural vehicle monitoring system of claim 1, wherein the determined vehicle location corresponds to a distance of the one or more sensors from the first crop row.

25. The agricultural vehicle monitoring system of claim 1, wherein the determined vehicle location corresponds to a distance from a first or second crop row to an opposed vehicle feature detected along the scan line.

26. The agricultural vehicle monitoring system of claim 1, wherein the one or more noncontact sensors include one or more of a radar sensor, LIDAR sensor, or ultrasound sensor.

27. The agricultural vehicle monitoring system of claim 1, comprising the agricultural vehicle.

28. An agricultural vehicle monitoring system comprising:
one or more noncontact sensors configured for coupling with an agricultural vehicle, the one or more noncontact sensors are configured to sense multiple objects along a scan line, the one or more noncontact sensors each include:
a scan line generator configured to generate the scan line; and
a scan line receiver configured to receive a reflection of the scan line;
wherein the scan line generator is oriented to generate the scan line orthogonally relative to a plurality of crop rows including at least first and second crop rows; and
one or more processors in communication with the one or more noncontact sensors, the one or more processors configured to:
receive a specified row width;
identify the plurality of crop rows from the scan line;
detect one or more amplitude peaks in the reflection of the scan line;
determine one or more lengths of scan line segments between identified crop rows based on the detected one or more amplitude peaks; and
determine a vehicle position including one or more of a vehicle angle or a vehicle location based on the specified row width and the one or more determined lengths of scan line segments between identified crop rows.

29. The agricultural vehicle monitoring system of claim 28, wherein the one or more processors are configured to:
determine the vehicle angle; and
determine the vehicle location relative to one or more crop rows.

30. The agricultural vehicle monitoring system of claim 28, wherein the one or more processors are configured to determine a position difference between the determined vehicle position and a target vehicle position.

31. The agricultural vehicle monitoring system of claim 30, wherein the one or more processors are configured to couple with one or more of an output device or an automated steering system.

32. The agricultural vehicle monitoring system of claim 31, wherein the agricultural vehicle includes first and second wheels, wherein the one or more noncontact sensors include at least first and second noncontact sensors,
the first noncontact sensor is configured for coupling proximate a first wheel of the agricultural vehicle and the scan line generator of the first noncontact sensor is directed toward a second wheel of the agricultural vehicle; and
the second noncontact sensor is configured for coupling proximate the second wheel and the scan line generator of the second noncontact sensor is directed toward the first wheel.

33. The agricultural vehicle monitoring system of claim 32, wherein the first noncontact sensor and the second noncontact sensor are configured for coupling proximate to a rear portion of a vehicle chassis of the agricultural vehicle.

34. The agricultural vehicle monitoring system of claim 32, wherein the one or more processors are configured to select the scan line for the second noncontact sensor if the vehicle location determined with the first noncontact sensor is proximate to the specified row width.

35. The agricultural vehicle monitoring system of claim 32, wherein the one or more processors are configured to select the scan line for the second noncontact sensor if the vehicle location determined with the first noncontact sensor is proximate to the specified row width including the specified row with and a sensor deadband for the first noncontact sensor.

36. The agricultural vehicle monitoring system of claim 28, wherein the scan line generator is oriented to generate the scan line perpendicularly relative to stalks of an agricultural crop.

37. The agricultural vehicle monitoring system of claim 28, wherein the scan line generator is oriented to generate the scan line parallel to the ground.

38. The agricultural vehicle monitoring system of claim 28, wherein the scan line generator is oriented to generate the scan line in a direction preceding the agricultural vehicle.

39. The agricultural vehicle monitoring system of claim 28, wherein the scan line generator is oriented to generate the scan line in a direction following the agricultural vehicle.

40. The agricultural vehicle monitoring system of claim 28, wherein the identification module is configured to identify the plurality of crop rows from the scan line with a row threshold.

41. The agricultural vehicle monitoring system of claim 28, wherein the one or more processors are configured to filter noise artifacts from the identified plurality of crop rows based on an identification of a first crop row and the specified row width.

42. The agricultural vehicle monitoring system of claim 28, wherein the one or more processors are configured to filter noise artifacts from the identified plurality of crop rows based on an identification of at least the first crop row.

43. The agricultural vehicle monitory system of claim 28, wherein the determined vehicle position corresponds to a distance of the one or more noncontact sensors from a first crop row.

44. The agricultural vehicle monitoring system of claim 28, wherein the determined vehicle position corresponds to a distance from the first row to an opposed vehicle feature detected along the scan line.

45. A method for monitoring an agricultural vehicle using a noncontact sensor, the method comprising:
generating, using the noncontact sensor, a scan line orthogonally relative to two or more crop rows;
receiving a reflection of the scan line from at least a first crop row of the two or more crop rows;
obtaining a crop row width;
detecting one or more amplitude peaks in the reflection of the scan line;
determining one or more lengths of scan line segments of the scan line based on the detected one or more amplitude peaks;
identifying one or more crop rows based on one or more lengths of scan line segments from the reflection of the scan line; and
determining a vehicle position of the agricultural vehicle according to the crop row width and the one or more determined lengths of scan line segments.

46. The method of claim 45, wherein determining the vehicle position comprises determining one or more of a vehicle angle or a vehicle location relative to a crop row of the two or more crop rows.

47. The method of claim 46, further comprising determining the vehicle angle by determining a wheel angle of a wheel of the agricultural vehicle according to the vehicle location and a mounting angle of the noncontact sensor.

48. The method of claim 46, further comprising determining the vehicle location according to a mounting angle of the noncontact sensor and a length of a scan line segment from the noncontact sensor to a first crop row of the one or more crop rows.

49. The method of claim 46, wherein the noncontact sensor comprises a forward directed noncontact sensor and an aft directed noncontact sensor, and the method further comprises determining the vehicle angle or the vehicle location according to:
a length of a first scan line segment from the forward directed noncontact sensor to a first crop row of the one or more crop rows; and
a length of a second scan line segment from the aft directed noncontact sensor to the first crop row.

50. The method of claim 46, further comprising coupling the noncontact sensor proximate to a rear wheel assembly of the agricultural vehicle and determining the vehicle angle or vehicle position based on an angle or a position of the rear wheel assembly relative to the first crop row.

51. The method of claim 45, further comprising determining the vehicle position according to:
a length of a scan line segment from the noncontact sensor to a first crop row of the one or crop rows; and
a length of a scan line segment from the noncontact sensor to a second crop row of the one or crop rows.

52. The method of claim 45, wherein:
the noncontact sensor comprises a first noncontact sensor coupled proximate to a first wheel of the agricultural vehicle and a second noncontact sensor coupled proximate to a second wheel of the agricultural vehicle; and
determining the vehicle position of the agricultural vehicle comprises determining a vehicle offset from a specified location between the first noncontact sensor and the second noncontact sensor.

53. The method of claim 45, further comprising identifying the two or more crop rows from the reflected scan line using a row threshold.

54. The method of claim 45, further comprising filtering noise artifacts from the identified two or more crop rows based on the crop row width.

55. The method of claim 45, wherein each of the one or more lengths of scan line segments corresponds to a distance between two crop rows of the two or more crop rows or a distance between the noncontact sensor and a crop row of the two or more crop rows.

* * * * *